(12) United States Patent
Kuno et al.

(10) Patent No.: US 6,378,031 B1
(45) Date of Patent: Apr. 23, 2002

(54) DATA PROCESSING APPARATUS AND FILE MANAGEMENT METHOD THEREFOR

(75) Inventors: Yoshiki Kuno, Moriguchi; Toshikazu Koudo, Nishinomiya, both of (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

(21) Appl. No.: 09/337,951

(22) Filed: Jun. 22, 1999

(30) Foreign Application Priority Data

Jul. 7, 1998 (JP) .......................................... 10-208647

(51) Int. Cl.$^7$ .......................... G06F 17/30; G06F 12/06
(52) U.S. Cl. ............................. 711/4; 711/112; 707/205
(58) Field of Search .......................... 707/205; 711/112, 711/4

(56) References Cited

U.S. PATENT DOCUMENTS 5,819,298 A * 10/1998 Wong et al. ................. 707/205

FOREIGN PATENT DOCUMENTS

JP 08278906 A 10/1996

OTHER PUBLICATIONS

IBM TDB Utilitarian File System, vol. 34, No. 3, pp. 472–479, reprinted from WEST.*

* cited by examiner

*Primary Examiner*—David L. Robertson
(74) *Attorney, Agent, or Firm*—Akin, Gump, Strauss, Hauer & Feld, L.L.P.

(57) ABSTRACT

In the data processing apparatus and file management method therefor of the present invention, when each piece of data in one of plural blocks is recorded as a data portion on a disk medium, continuous ID numbers are assigned to the individual continuous blocks, each of the assigned ID numbers is stored in the ID portion of sub-code portion, address information indicating the recording position of the head of at least the next block is stored in the link portion of the sub-code portion, and the sub-code portion is recorded together with the data portion of the block on the disk medium.

32 Claims, 11 Drawing Sheets

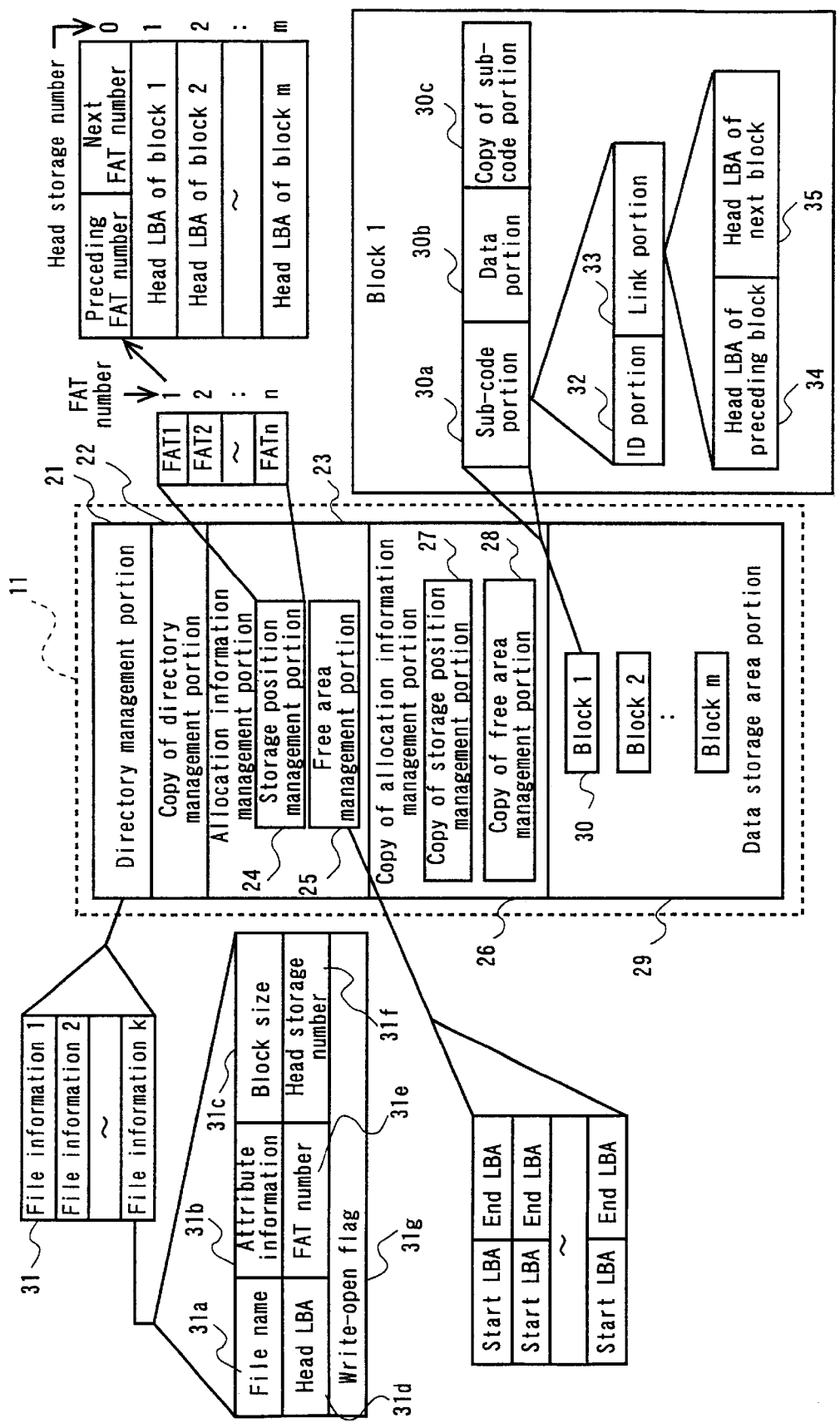
F I G. 2

F I G. 5
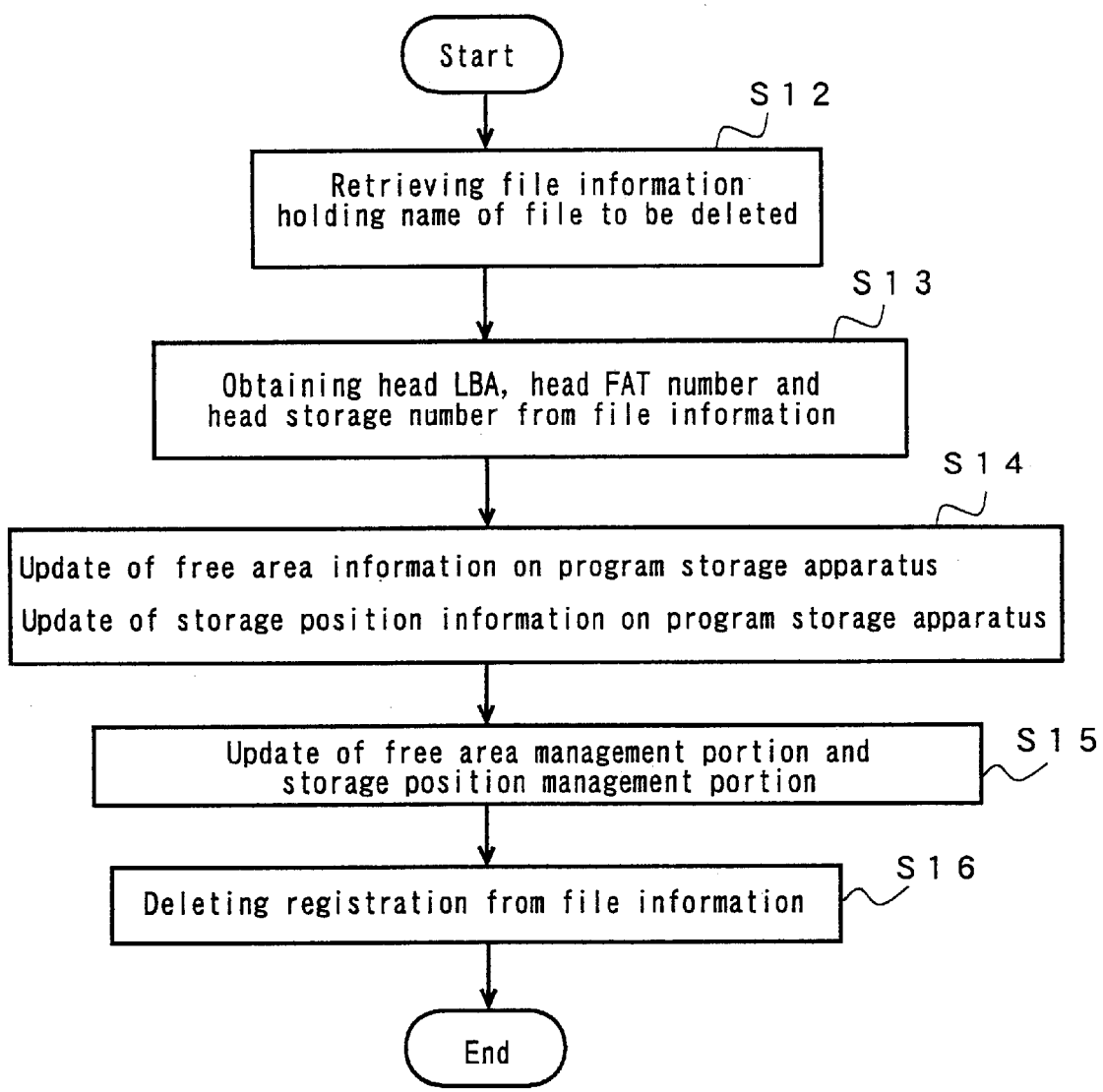

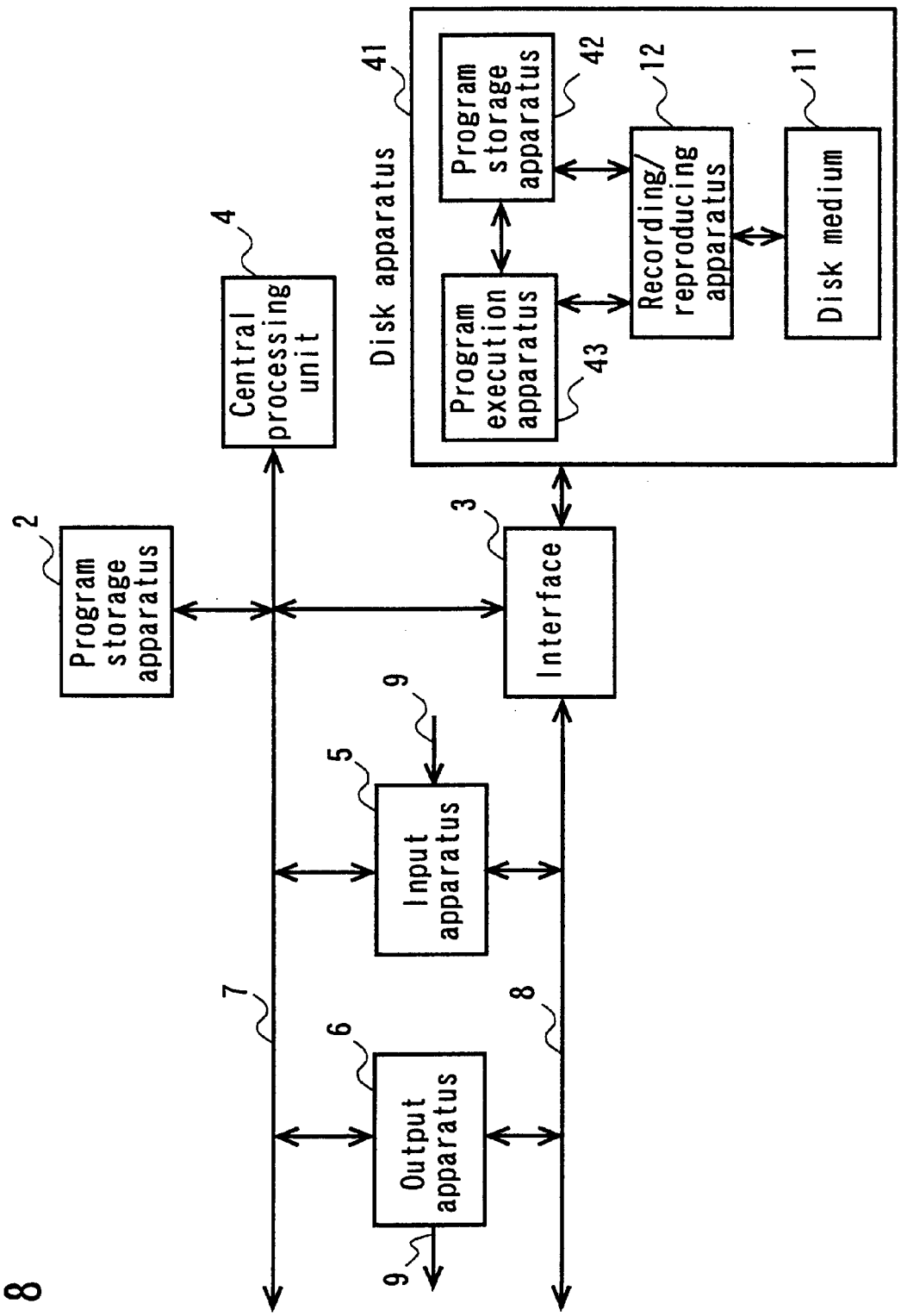
F I G. 8

DATA PROCESSING APPARATUS AND FILE MANAGEMENT METHOD THEREFOR

BACKGROUND OF THE INVENTION

The present invention relates to a data processing apparatus comprising a disk apparatus for recording and reproducing a large amount of continuous multimedia data including digital audiovisual information (herein also maybe referred to as "AV data") in a personal computer (hereinafter simply referred to as a "PC") and a home-use multimedia apparatus or the like, and to a file management method therefor.

Conventionally, audiovisual information has been recorded and reproduced mainly on magnetic tape. However, in accordance with the progress in the recent digital technology, a system of recording audiovisual information by using digital signals has become the dominant recording system instead of the recording system using analog signals. On the other hand, the range of uses for recording and reproducing AV data in real time by using the PC is increasing because of the rapid widespread proliferation of the PC and the development and practical utilization of a disk apparatus with built-in mass-storage disk media. In other words, a data processing apparatus including the PC is strongly requested to be able to easily carry out data processing, such as storage, editing and treatment, in accordance with the above-mentioned progress in technology. In the case of the above-mentioned data processing, a file system under the management of a known operating system (hereinafter referred to as an "OS") installed ordinarily in the PC for example is used as a file management method for the AV data.

A file system included in a typical OS used for the PC is taken here as an example to explain a conventional file management method.

In order to carry out a file management, it is necessary to execute management to find out where a physical position of data recorded in a file is stored on the recording medium (disk medium) of the disk apparatus. On the other hand, the area of the recording medium of the disk apparatus is usually divided into units each referred to as a sector. Continuous logical block addresses (hereinafter each referred to as an "LBA") are assigned to the individual sectors, so that the disk apparatus deals with its whole area as a single linear area. Therefore, the LBA on the disk apparatus corresponding to the head position of the data, for example, is controlled by the file management in the physical position of data recorded in the file.

Generally, data is divided into a plurality of fixed-length blocks (usually referred to as clusters), and a table indicating the correspondence of each cluster and an LBA on the disk apparatus is used for management. One cluster has a plurality of continuous sectors. The above-mentioned table is referred to as a file allocation table (hereinafter simply referred to as a "FAT"). This FAT holds cluster chain information for linking divided plural clusters to form one file. Furthermore, this FAT is stored and disposed in a recording area different from the data recording area on the disk apparatus. After the PC is started, the FAT is read from the disk apparatus to the main storage apparatus.

The above-mentioned FAT will be described below more specifically referring to FIG. 11.

FIG. 11 is an explanatory view showing a concrete example of a FAT used for the conventional file management method.

In a conventional data processing apparatus, as shown in FIG. 11, a disk medium 100 has a plurality of recording areas, and the AV data and management information for managing the AV data are stored separately in the recording areas respectively corresponding thereto. In other words, the disk medium 100 is provided with recording areas 101 and 102 for storing the FAT and its copy, respectively, as shown in FIG. 11. Furthermore, the disk medium 100 is provided with a directory management portion 103 for holding plural pieces of file information, a recording area 104 for holding a copy of the directory management portion and a data storage area portion 105 for holding the AV data.

Each cluster of the conventional FAT holds the cluster chain information for indicating the cluster number of the link destination linked to the cluster. By referring to this FAT, clusters can be detected from one cluster to another, whereby it is possible to obtain the record positions of all the data constituting one file. More specifically, when the first cluster number of a file is 2, for example, cluster numbers 4, 3, 7, 6 and 5 can be obtained in sequence in accordance with the cluster chain information as shown in FIG. 11. A hexadecimal value "FFFF" shown in FIG. 11 indicates that the cluster holding this value is the last cluster. Furthermore, values to be stored as the cluster chain information in the FAT are 12-bit, 16-bit or 32-bit data, for example.

When a FAT using 16-bit cluster chain information is explained for example, the maximum value capable of being described as the cluster chain information is (2 raised to the 16th power−1=65,535). In this case, value 0 indicates that the cluster holding this value is a free cluster on the disk medium 100. Value 65535 ("FFFF" in hexadecimal notation) is used as a special value indicating that the cluster holding this value is the last cluster in the file. As a result, in the case of the FAT using 16-bit cluster chain information, the whole recording area of the disk medium 100 is divided into 65534 clusters and managed. In addition, in the conventional file management method using this FAT, numbers are assigned to clusters, beginning with its head cluster in sequence, to manage the correspondence of the numbers to the LBAs on the disk apparatus. More specifically, each LBA on the disk apparatus can be obtained by (the cluster number corresponding to the LBA)×(the number of sectors per cluster)+(offset LBA). The offset LBA mentioned above is an LBA assigned to the head position of the data storage area portion 105.

In the conventional data processing apparatus, the file management is carried out by the conventional file management method using the above-mentioned FAT. In the conventional data processing apparatus and the file management method therefor, the FAT is read from the disk apparatus to the main storage apparatus after the apparatus is started. Therefore, in the conventional data processing apparatus and the file management method therefor, when target data is read and/or written on the disk apparatus, the data is read and/or written at high speed referring to the FAT having been read in the main storage apparatus, instead of the FAT on the disk apparatus.

However, the above-mentioned conventional data processing apparatus and file management method therefor cause the following problem. That is to say, in the case of the above-mentioned prior art, the FAT on the disk apparatus is updated after file writing, namely, after file closing. Therefore, if an electric power to the PC or the disk apparatus is shut off during file writing, the FAT on the disk apparatus is not updated. As a result, even if a part of file data at the file writing has been recorded on the disk apparatus before power shut-off, the file management information including the FAT is not updated to that corresponding to the recorded data. This cause a problem of unable to judge which file data corresponds to the data recorded on the disk apparatus, and the file data at the file writing in the power shut-off cannot be read at all.

In order to solve this problem, it may be possible to use a method of frequently updating the FAT on the disk apparatus. However, in the case of this method, both the recording area for holding management information such as the FAT and the recording area for holding data must be accessed frequently and alternatively in the disk apparatus. Particularly when real-time data such as the AV data is recorded while accessing two recording areas alternatively in the disk apparatus, the performance of the real-time processing is impaired fatally. This method is thus not effective.

Furthermore, it may be possible to use a method of coping with the power shut-off by using an uninterruptible power supply or the like. However, such an uninterruptible power supply is generally expensive, and used only for limited types of apparatuses such as servers.

Moreover, even if a new file management method capable of solving the problems encountered in the conventional file management method is devised, a file system is included as a function of the OS in the case of the conventional data processing apparatus. Therefore, the OS installed on the PC must be changed or upgraded for example, in order to use the new file management method for the conventional data processing apparatus. This causes another problem.

BRIEF SUMMARY OF THE INVENTION

The object of the present invention is to provide a data processing apparatus and file management method therefor that can solve the aforementioned problems in the conventional data processing apparatus and file management method therefor.

In order to achieve the above-mentioned object, a data processing apparatus comprises:

a disk apparatus for dividing data of a file into plural blocks and recording the plural blocks on a disk medium, a program storage apparatus for storing programs, a central processing unit for executing the programs, and an interface for connecting the disk apparatus, the program storage apparatus and the central processing unit, wherein, when each piece of data in one of the plural blocks is recorded as a data portion on the disk medium, continuous ID numbers are assigned to the individual continuous blocks, each of the assigned ID numbers is stored in an ID portion of a sub-code portion, address information indicating a recording position of the head of at least the next block is stored in a link portion of the sub-code portion, and the sub-code portion is recorded together with the data portion of the block on the disk medium.

According to this configuration, the continuity of blocks can be judged easily by reading the link portion each of the plural blocks in sequence, and by comparing the respective ID numbers each of the ID portion with one another. As a result, continuous blocks are judged as one file, whereby the management information of the file can be recovered, and the data of the file can be read.

A data processing apparatus according to another aspect of the invention comprises:

a disk apparatus for dividing data of a file into plural blocks and recording the plural blocks on a disk medium, a program storage apparatus for storing programs, a central processing unit for executing the programs, and an interface for connecting the disk apparatus, the program storage apparatus and the central processing unit, wherein, when each piece of data in one of the plural blocks is recorded as a data portion on the disk medium, a unique ID number is assigned to the blocks of each file, the assigned ID number is stored in an ID portion of a sub-code portion, address information indicating a recording position of the head of at least the next block is stored in a link portion of the sub-code portion, and the sub-code portion is recorded together with the data portion of the block on the disk medium.

According to this configuration, the continuity of blocks can be judged easily by reading the link portion each of the plural blocks in sequence, and by comparing the respective ID numbers each of the ID portion. As a result, continuous blocks are judged as one file, whereby the management information of the file can be recovered, and the data of the file can be read.

A data processing apparatus according to another aspect of the invention further comprises an input portion for inputting audiovisual information and an output portion for outputting said audiovisual information.

According to this configuration, the continuity of data blocks of audiovisual information can be judged easily.

A data processing apparatus according to another aspect of the invention, wherein the disk apparatus comprises a second program storage apparatus for storing a file management program for managing the file and a program execution apparatus for executing the file management program, and a file management interface for connecting the disk apparatus to the central processing unit is provided to carry out the file management in the disk apparatus.

According to this configuration, the file management method can be changed easily without changing or upgrading an operating system.

A data processing apparatus according to another aspect of the invention, wherein a write-open flag indicating whether a file recorded on the disk medium is opened in a data writing ready condition or not is recorded in file information to be created for each file as file management information of the file.

According to this configuration, a file undergone ending in the middle of writing can be detected quickly.

A data processing apparatus according to another aspect of the invention, wherein a copy of the sub-code portion is created in units of blocks and recorded together with the data portion and the sub-code portion of the corresponding block in the disk apparatus.

According to this configuration, even if a specific sub-code portion cannot be read because of a defective area generated on the disk medium, required data portion can be read by referring to the copy of the sub-code portion, whereby data processing can be continued automatically.

A data processing apparatus according to another aspect of the invention, wherein a block size to be recorded on the disk medium is determined for each file.

According to this configuration, it is possible to prevent invalid areas from generating on the disk medium.

A data processing apparatus according to another aspect of the invention, wherein the central processing unit obtains a minimum transfer speed which is not less than the transfer speed of data to be recorded, of the disk apparatus, and determines said block size to be recorded on the disk medium on the basis of a continuous writing size uniquely determined for the obtained minimum transfer speed.

According to this configuration, the block size of data to be recorded on the disk medium becomes appropriate to the requested transfer speed of the data, whereby it is possible to ensure the above-mentioned transfer speed.

A data processing apparatus according to another aspect of the invention, wherein the link portion holds address information indicating recording positions of the heads of the blocks ahead of and next to the block corresponding to the link portion.

According to this configuration, data reading can be carried out easily in both the normal and reverse directions without causing any burden on the processing at the central processing unit. As a result, it is possible to carry out smooth rewinding reproduction.

A data processing apparatus according to another aspect of the invention, wherein the program execution apparatus prefetches plural blocks on the basis of the link portion each of the plural blocks and stores the blocks in the program storage apparatus.

According to this configuration, data prefetch can be made very effectively. It is thus possible to configure a data processing apparatus for processing continuous media data in particular.

A data processing apparatus according to another aspect of the invention, wherein the program execution apparatus obtains minimum transfer speed, which is not less than the transfer speed of data to be recorded, of the disk apparatus, and determines the block size to be recorded on the disk medium on the basis of a continuous writing size uniquely determined for the obtained minimum transfer speed.

According to this configuration, the central processing unit is not required to grasp the characteristic of the disk apparatus to be connected, and the data transfer speed can be ensured easily.

A data processing apparatus according to another aspect of the invention, wherein the central processing unit outputs a program download command to the program execution apparatus to record a new file management program in the disk apparatus.

According to this configuration, updating to the new file management program can be attained by the central processing unit without changing or upgrading the operating system, whereby the file management method can be changed easily.

A file management method comprises:
  a step of assigning continuous ID numbers to said individual continuous blocks,
  a step of storing each of the assigned ID numbers in an ID portion of a sub-code portions,
  a step of storing address information indicating a recording position of the head of at least the next block in a link portion of the sub-code portion, and
  a step of recording the sub-code portion together with the data portion of the block on the disk medium.

According to this configuration, the continuity of blocks can be judged easily by reading the link portion each of the plural blocks in sequence, and by comparing the respective ID numbers each of the ID portion.

A file management method according to another aspect of the invention comprises:
  a step of assigning a unique ID number to the blocks of each file,
  a step of storing each of the assigned ID numbers in an ID portion of a sub-code portions,
  a step of storing address information indicating a recording position of the head of at least the next block in a link portion of the sub-code portion, and
  a step of recording the sub-code portion together with the data portion of the block on the disk medium.

According to this configuration, the continuity of blocks can be judged easily by reading the link portion each of the plural blocks in sequence, and by comparing the respective ID numbers each of the ID portion.

A file management method according to another aspect of the invention further comprises:
  a step of comparing two of said ID numbers, and
  a step of checking whether two blocks assigned with the respective ID numbers are continuous or not on the basis of the result of the comparison at the comparison step, and judging that the two blocks belong to the same file in the case when the two blocks are continuous, and that the two blocks belong to different files in the case when the two blocks are not continuous.

According to this configuration, the management information of the file can be recovered, and the data of the file can be read.

A file management method according to another aspect of the invention, wherein a write-open flag indicating whether a file recorded on the disk medium is opened in a data writing ready condition or not is recorded in file information to be created for each file.

According to this configuration, a file undergone ending in the middle of writing can be detected quickly.

A file management method according to another aspect of the invention, wherein a copy of the sub-code portion is created in units of blocks and recorded together with the data portion and the sub-code portion of the corresponding block in the disk apparatus.

According to this configuration, even if a specific sub-code portion cannot be read because of a defective area generated on the disk medium, required data portion can be read by referring to the copy of the sub-code portion, whereby data processing can be continued automatically.

A file management method according to another aspect of the invention, wherein a block size to be recorded on the disk medium is determined for each file.

According to this configuration, it is possible to prevent invalid areas from generating on the disk medium.

A file management method according to another aspect of the invention, wherein a minimum transfer speed, which is not less than the transfer speed of data to be recorded, of the disk apparatus is obtained, and the block size to be recorded on the disk medium is determined on the basis of a continuous writing size uniquely determined for the obtained minimum transfer speed.

According to this configuration, the block size of data to be recorded on the disk medium becomes appropriate to the requested transfer speed of data, whereby it is possible to ensure the above-mentioned transfer speed.

A file management method according to another aspect of the invention, wherein the link portion holds address information indicating recording positions of the heads of the blocks ahead of and next to the block corresponding to the link portion.

According to this configuration, data reading can be carried out easily in both the normal and reverse directions without causing any burden on the processing at the central processing unit. As a result, it is possible to carry out smooth rewinding reproduction.

BRIEF DESCRIPTION OF THE SEVERAL VIEWS OF THE DRAWING

FIG. 2 is an explanatory view showing a configuration of the disk medium and concrete information on the disk medium shown in FIG. 1.

FIG. 5 is a flowchart showing an operation of a file deletion process in the data processing apparatus shown in FIG. 1.

FIG. 8 is a block diagram showing a schematic configuration of a data processing apparatus in accordance with a second embodiment of the present invention.

DETAILED DESCRIPTION OF THE INVENTION

Preferred embodiments of a data processing apparatus and file management method therefor in accordance with the present invention will be described below referring to the accompanying drawings.

First Embodiment

[Configuration of the Data Processing Apparatus]

Figure 1:
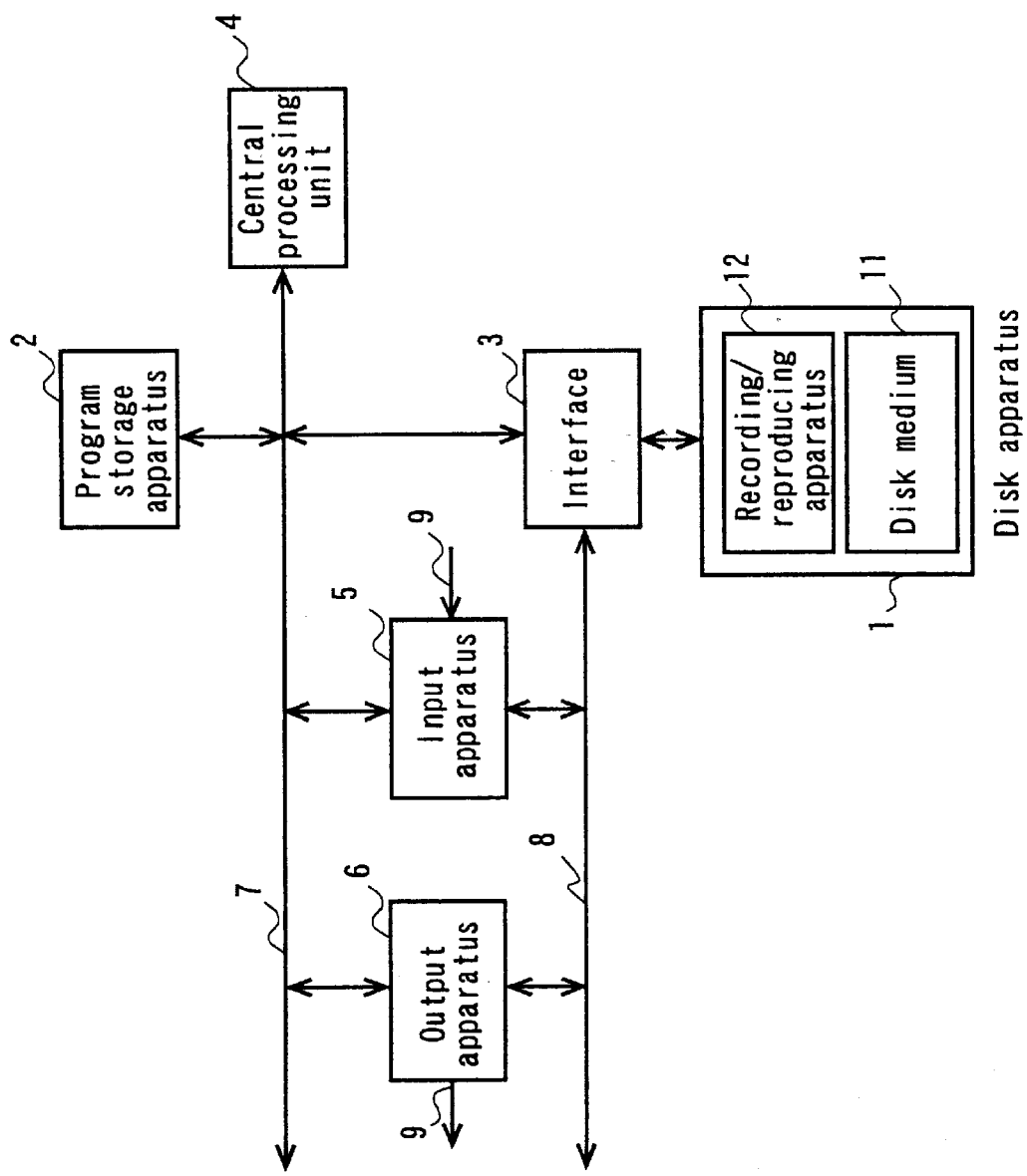
FIG. 1 is a block diagram showing a schematic configuration of a data processing apparatus in accordance with a first embodiment of the present invention.

FIG. 1 is a block diagram showing a schematic configuration of a data processing apparatus in accordance with a first embodiment of the present invention.

Referring to FIG. 1, the data processing apparatus of the present embodiment comprises a disk apparatus 1 for recording and reproducing audiovisual information (hereinafter referred to as "AV data"), a program storage apparatus 2 for storing programs and executing the stored programs, an interface 3 for connecting the disk apparatus 1, and a central processing unit 4 for executing the programs. The disk apparatus 1 is a secondary storage apparatus and slower in speed than the program storage apparatus 2 used as the main storage apparatus. The program storage apparatus 2 holds a file management program for executing the file management method of the present embodiment, and an operating system (OS). The central processing unit 4 is formed of a CPU or MPU, and controls the operation of the other components of the apparatus by using the above-mentioned operating system. Furthermore, the central processing unit 4 of the present embodiment carries out a file management for the AV data recorded and reproduced by the disk apparatus 11 on the basis of the above-mentioned file management program (the details will be described later.)

In addition, the data processing apparatus of the present embodiment comprises an input apparatus 5 for quantizing an audiovisual signal 9 from an external apparatus (not shown) and for inputting the quantized signal, an output apparatus 6 for converting the quantized audiovisual signal into the original audiovisual signal 9 and for outputting the signal to the external apparatus, a bus 7 connected to the central processing unit 4, and a special-purpose bus 8 for connecting the disk apparatus 1 to the input apparatus 5 and the output apparatus 6 via the interface 3. The data processing apparatus of the present embodiment can be accomplished easily by using a known hardware provided with a video capture function capable of inputting and outputting audiovisual signals at high speed, such as a disk apparatus and a PC(Personal Computer).

The disk apparatus 1 comprises a disk medium 11 used as a recording medium for recording the AV data, and a recording and reproducing apparatus 12 for recording the AV data to the disk medium 11 and for reproducing the AV data from the disk medium 11. The recording and reproducing apparatus 12 comprises a known head or pickup, an actuator for moving the head or pickup, and a signal processing circuit (not shown) for carrying out mutual conversion between recorded signals on the disk medium 11 and digital signals passing through the interface 3.

The flow of the AV data to be input to and output from the disk apparatus 1 will be described below.

First, in the case that the AV data is recorded on the disk medium 11, the audiovisual signal 9 is quantized continuously by the input apparatus 5 without interruption. The quantized audiovisual signal 9 is converted into the AV data, and output to the special-purpose bus 8. The AV data is then sent to the disk apparatus 1 via the interface 3, and recorded on the disk medium 11 by the recording and reproducing apparatus 12.

On the other hand, in the case that the AV data is reproduced from the disk medium 11, the recording and reproducing apparatus 12 reproduces the AV data from the disk medium 11, and outputs the reproduced AV data to the special-purpose bus 8 via the interface 3. The AV data is then inversely quantized, converted into the audiovisual signal 9 and output by the output apparatus 6.

[Configuration of the Disk Medium and Management Information]

Next, the disk medium 11 of the present embodiment and information stored on the disk medium will be described below specifically referring to FIG. 2.

FIG. 2 is an explanatory view showing a configuration of the disk medium and concrete information on the disk medium shown in FIG. 1.

As shown in FIG. 2, the disk medium 11 comprises a directory management portion 21 for holding plural pieces of file information 31, an allocation information management portion 23 having a storage position management portion 24 for holding data storage position information and a free area management portion 25 for holding free area information, and a data storage area portion 29 for holding data in units of blocks. Furthermore, the disk medium 11 comprises a recording area 22 for holding a copy of the directory management portion and a recording area 26 for holding a copy of the allocation information management portion. The recording area 26 is separated into a recording area 27 for holding a copy of the storage position management portion and a recording area 28 for holding a copy of the free area management portion. These copies are written on the disk medium 11 simultaneously with the management information in the management portions corresponding thereto. If a partial data reading error occurs in the information in a management portion owing to the generation of a locally defective area or the like on the disk medium 11, the copy corresponding to the information in the management portion is read and referred to instead of the information in the management portion. The areas for the above-mentioned storage position information and the free area information on the disk medium 11 are designated by using logical block addresses (hereinafter each referred to as an "LBA") assigned to the disk apparatus 1 (FIG. 1).

In the directory management portion 21, individual information regarding a plurality of files 1 to k files for example, recorded on the disk medium 11 is stored as file information 31.

In the storage position management portion 23, storage position information is stored and retained in the form of a file allocation table (hereinafter referred to as a "FAT"). Unlike the FAT of the conventional example wherein one FAT is used for the whole disk medium, the FAT of the present embodiment is generated for every predetermined block. That is, in the present embodiment, for example a plurality of FATs 1 to n (n: an integer) are formed (the detail will be described later). By providing the plurality of FATs 1 to n, retrieval performance can be improved. For this reason, when making random access to data in the file, the central processing unit 4 requires shorter processing time consumed for obtaining the target LBA from the storage position management portion 23.

As free area information indicating an area (free area) capable of newly recording data, the start LBA and the end LBA of the information are stored in the free area management portion 24 as shown in FIG. 2.

The data storage area portion 29 comprises a plurality of blocks 30 whose one block is the minimum division unit of data, and a plurality of free areas individually indicated by the above-mentioned free area information. In other words, data is divided into block 1 to block m (m: an integer) for example, and recorded in this order in the data storage area portion 29.

Management information stored in the above-mentioned management portions and the data structure in the data storage area portion will be described below in detail.

First, the contents of the file information 31 stored in the directory management portion 21 will be described below in detail. By these plural pieces of file information 31, directory information including file list information is formed.

Each piece of file information 31 comprises a file name 31a, file attribute information 31b, a block size 31c, a head LBA 31d, a FAT number 31e, a head storage number 31f and a write-open flag 31g. In the file attribute information 31b, for example information such as date and time of file creation, a file creator's name, the last access date and time, and a file size is stored. The number of bytes for one block in the file is stored in the block size 31c. Instead of the number of bytes, the number of sectors may be used. The position information wherein the head block of the file is recorded, i.e. the head LBA, is stored in the head LBA 31d. In the FAT number 31e, a FAT number is stored. The FAT number indicates the FAT wherein the head LBA of the first data in the file is stored among a plurality of FATs stored in the storage position management portion 24. In the head storage number 31f, a head storage number is stored. The storage number indicates the location in the FAT storing the head LBA of the head block of the file. More specifically, in the case that the head block of the file is block 1, for example the head storage number 1 storing the head LBA of block 1 is stored in the first storage number 31f. The relative number of bytes from the head of FAT 1 to the position wherein the head LBA of block 1 is stored in the FAT may be stored instead of the head storage number 31f. In other words, the head LBA information of the head block of the file should only be information indicating where the head LBA information is stored in the FAT designated by the FAT number. In the write-open flag 31g, a flag indicating "true" is stored in the case when a file in which data is written is open. In other cases, a flag indicating "false" is stored therein.

Next, the detailed structure of the FAT stored in the storage position management portion 24 will be described below.

In each of FATs 1 to n, as shown in FIG. 2, a preceding FAT number indicating the number of the FAT provided ahead of a current FAT, a next FAT number indicating the number of the FAT provided next to the current FAT, and the head LBAs of all blocks controlled by the current FAT are stored in sequence. The sequence of the head LBAs is aligned with the sequence of the divided blocks of the original data. The head LBA of the preceding FAT and the head LBA of the next FAT may be used instead of the preceding FAT number and the next FAT number, respectively. In other words, information linked to the preceding FAT and the next FAT should only be used, respectively. In the case that the current FAT is the head FAT, a special value "FFFF" in hexadecimal notation, for example, is recorded as the preceding FAT number, so that the current FAT is identified as the head FAT. Likewise, in the case that the current FAT is the last FAT, the special value "FFFF" is recorded, so that the current FAT is identified as the last FAT. In addition, it is assumed that a FAT holding "0" recorded as both the preceding FAT number and the next FAT number is identified as a free FAT wherein new information can be recorded. The size of each of the FATs 1 to n is variable in length. However, in the following explanation, it is assumed that the size thereof is fixed in order to facilitate explanation.

Next, the blocks 30 will be described below in detail.

Each block 30 comprises a sub-code portion 30a including an ID portion 32 and a link portion 33, a data portion 30b, i.e. data itself, and a copy 30c of the sub-code portion. The copy 30c of the sub-code portion is written on the disk medium 11 simultaneously with the sub-code 30a. The copy 30c of the sub-code portion is referred to in the case that the sub-code 30a cannot be read because of a partial data reading error due to the generation of a locally defective area or the like on the disk medium 11. The ID portion 32 holds an ID number assigned to the data of the data portion 30b. More specifically, in this embodiment, a series of continuous ID numbers are assigned to the individual continuous blocks 30 wherein continuous data is stored in sequence. Each of the assigned ID numbers is stored in the corresponding ID portion 32. For example, when a series of data is divided in sequence and stored in block 1, block 2 and block 3, numbers 1, 2 and 3 are assigned in sequence for the blocks 1, 2 and 3, respectively, as the ID number. As the ID number, a series of numbers starting with 0 or 1 is assigned to the blocks from the head block in sequence, for example, every the file. However, a number other than 0 or 1 may be assigned as the ID number of the head block. The storage position information of the blocks ahead of and next to a block for holding the series of data is stored in the link portion 33. In other words, as shown in FIG. 2, the head LBA 34 of the preceding block and the head LBA 35 of the next block are stored in the link portion 33.

The relationship between data and file management information for managing the data will be described below specifically referring to FIG. 3.

Figure 3:
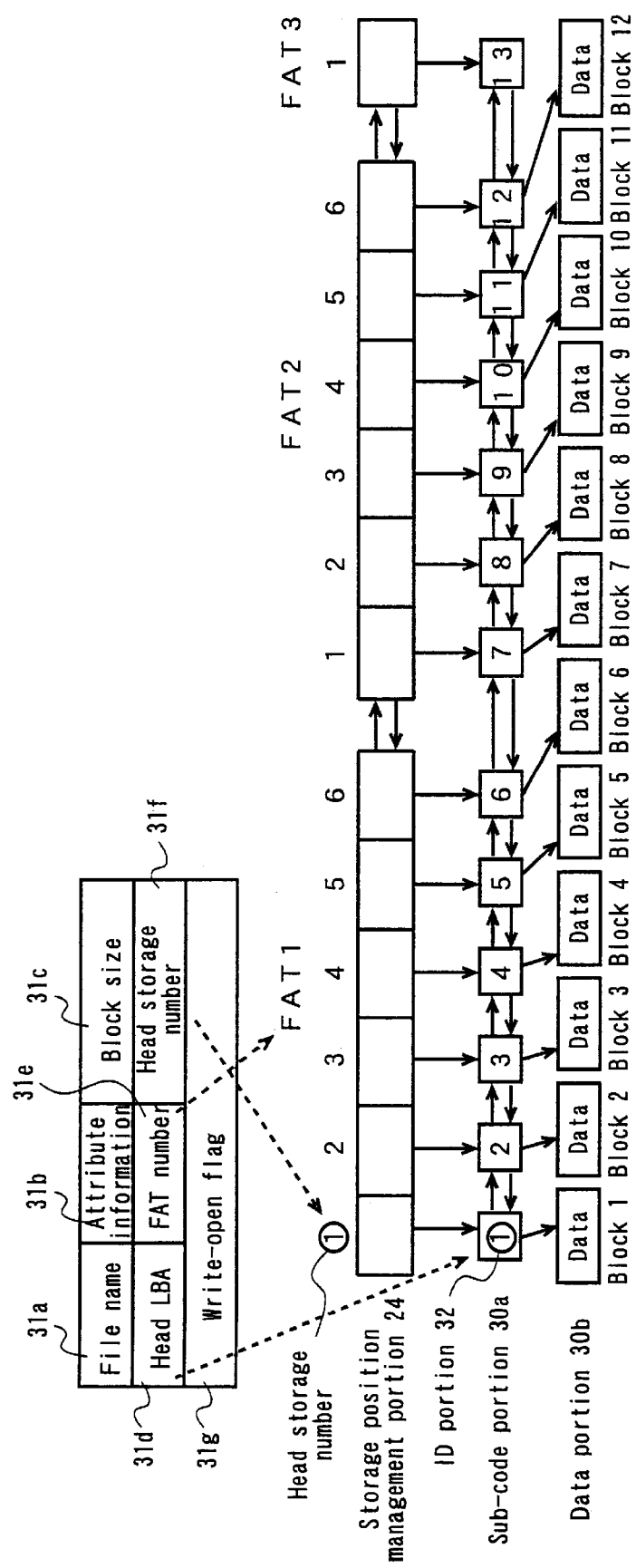
FIG. 3 is an explanatory view showing a mutual relationship among plural pieces of file management information shown in FIG. 2.

FIG. 3 is an explanatory view showing a mutual relationship among the plural pieces of file management information shown in FIG. 2.

In FIG. 3, only the 12 blocks from the head block, i.e., the blocks 1 to 12 are shown among m blocks constituting one file. The data in each of the blocks 1 to 12 is stored in the data storage area portion 29 as the data portion 30b. Unique ID numbers are assigned to the blocks 1 to 12, respectively, in the sequence of the blocks 1 to 12. Each assigned ID number is held in the ID portion 32 of the sub-code portion 30a, and stored together with the data portion 30b corresponding thereto in the data storage area portion 29.

On the other hand, the head LBA of the block 1 is stored in the head LBA 31d of the file information 31, and the FAT number of the FAT holding the above-mentioned head LBA, i.e. FAT 1 in the example shown in FIG. 3, is stored in the FAT number 31e. Furthermore, head storage number 1 indicating the storage position of the head LBA of the head block of the file in the FAT 1 is stored in the head storage number 31f. Moreover, as shown in FIG. 3, one FAT is generated as storage position information for every six blocks, for example, and stored in the storage position management portion 24. In the case of the FAT 1 stored in the above-mentioned FAT number 31e, "FFFF" used as the preceding FAT number, "2" used as the next FAT number and the head LBAs of the blocks 1 to 6 under the management of the FAT 1 are stored in sequence as shown in FIG. 2.

[Operation of the Data Processing Apparatus]

Operation of the data processing apparatus of the present embodiment will be described below.

Basic operations of the data processing apparatus in accordance with the file management method of the present embodiment are recording (writing), reproducing (reading) and deleting data. In other words, the basic operations are creating the file, adding data to the file, writing data to the file, reading data from the file and deleting the file. In addition to these basic operations, other operations are carried out by using a directory command for obtaining file list information, a file status command for obtaining the attribute information of each the file and the like.

First, a process carried out at the start of the data processing apparatus will be described below, before explaining the above-mentioned basic operations.

The file management method of the present embodiment is started when the data processing apparatus is turned on or restarted. In other words, the file management program is stored in the program storage apparatus 2 (FIG. 1), and the file management is carried out by the central processing unit 4 (FIG. 1). More specifically, in the file management method of the present embodiment, all the information in the storage position management portion 24 (FIG. 2) and the free area management portion 25 (FIG. 2) of the disk apparatus 1 (FIG. 1) is read and stored in the program storage apparatus 2 immediately after the apparatus is started. This completes the process required at the time of starting the data processing apparatus.

Furthermore, in the processes carried out by using the directory command for obtaining the list information of the file information 31 (FIG. 2) and the file status command for obtaining the attribute information 31b of each the file, desired information can be obtained by retrieving and extracting the file name 31a, the attribute information 31b and the like of the file information 31 in the directory management portion 21 (FIG. 2).

Next, a file creation process and a data writing process in the data processing apparatus of the present embodiment shown in FIG. 1 will be described below referring to FIG. 4.

Figure 4:
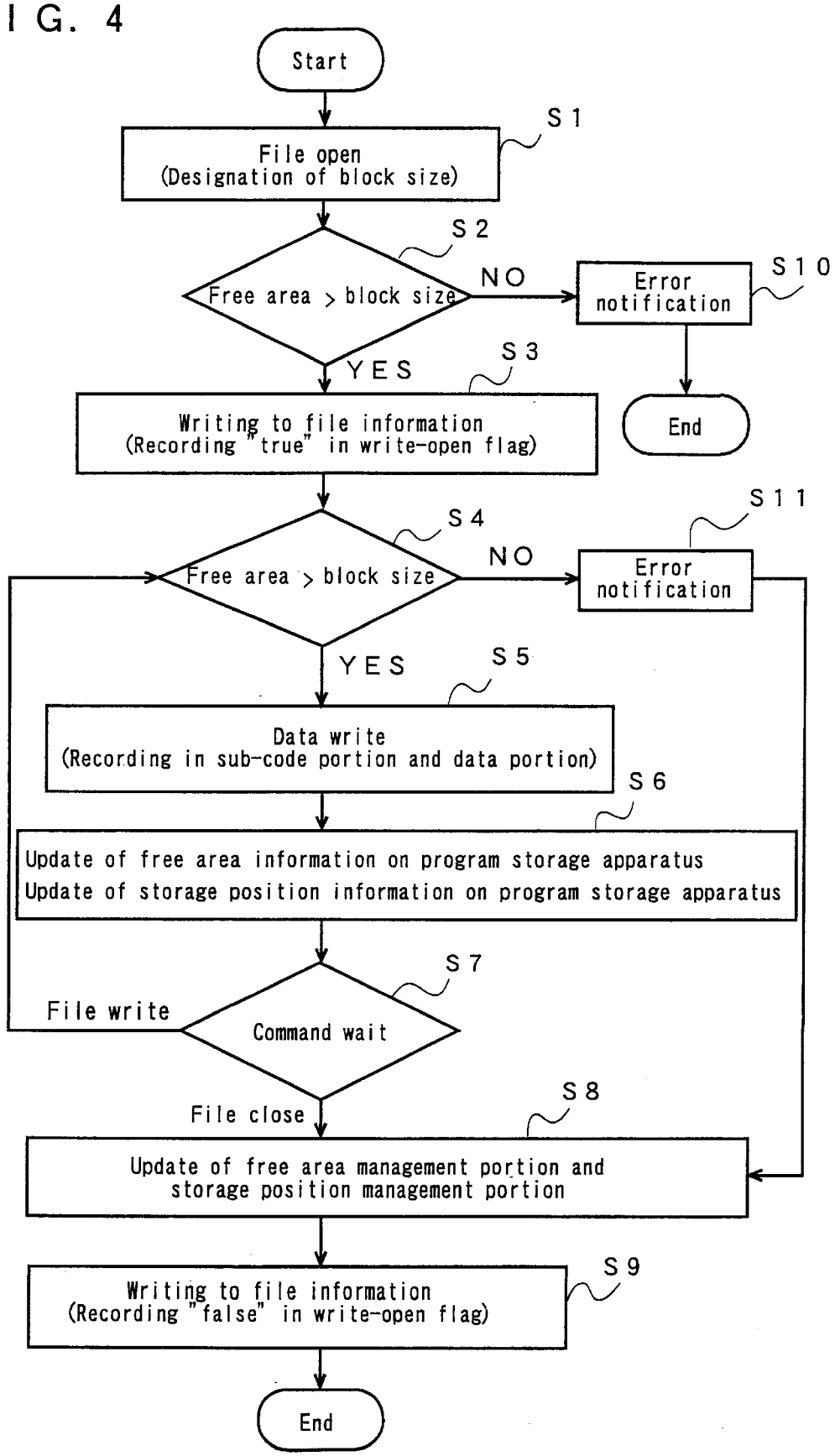
FIG. 4 is a flowchart showing operations of a file creation process and a data writing process in the data processing apparatus shown in FIG. 1.

FIG. 4 is a flowchart showing operations of a file creation process and a data writing process in the data processing apparatus shown in FIG. 1.

First, the file creation process in the data processing apparatus of the present embodiment will be described below.

As shown in FIG. 4, first, the file is opened (step S1). At this file open step, the operator, such as the user of the apparatus, specifies an open mode wherein the file name and data writing are designated to the central processing unit 4 (FIG. 1). Furthermore, the block size of the file to be created is designated thereto. By this designation of the block size, the data processing apparatus of the present embodiment can prevent invalid areas from generating in the disk medium 11 (the detail will be described later). Moreover, in the data processing apparatus of the present invention, by the operator's designation of the transfer speed of the AV data to be recorded as described later, a proper block size can be designated automatically in accordance with the transfer rate (transfer speed) of the AV data. As a result, it is possible to easily ensure the transfer speed of the AV data to be requested.

Next, the central processing unit 4 retrieves the free area information in the free area management portion 25 (FIG. 2) having been read on the program storage apparatus 2, and makes a comparison between the designated block size and the free area (step S2). In the case that no free area is available, or in the case that the free area is smaller than the designated block size, the central processing unit 4 carries out an error notification (step S10), and the process ends.

On the other hand, in the case that the free area is larger than the designated block size, the central processing unit 4 writes data in the file information 31 (step S3). More specifically, the central processing unit 4 records the file name 31a, the attribute information 31b and the block size 31c shown in FIG. 2 in the directory management portion 21 on the disk medium 11 for the new file information 31. In addition, the start LBA of the retrieved free area is recorded as the head LBA 31d (FIG. 2) in the above-mentioned file information 31. Furthermore, the central processing unit 4 retrieves a free FAT in the storage position information in the storage position management portion 24 (FIG. 2) having been read on the program storage apparatus 2. The central processing unit 4 then records the FAT number of the retrieved FAT and the head storage number indicating the storage position of the head block of the FAT in the FAT number 31e and the head storage number 31f of the file information 31 (FIG. 2), respectively. Whether the FAT is free or not can be identified by determining whether the preceding FAT number and the next FAT number of the FAT are 0 or not, for example. Next, the central processing unit 4 records the flag indicating "true" in the write-open flag 31g (FIG. 2). The file creation process is completed by the above-mentioned actions.

Next, the data writing process to the file will be described below. In the following description, it is supposed that this data writing process will be carried out after the above-mentioned file creation process.

When the central processing unit 4 inputs a data write command, the central processing unit 4 retrieves the free area information and makes a comparison between the designated block size and the free area (step S4) just as in the case of the action indicated at step S2. In the case that no free area is available, or in the case that the free area is smaller than the designated block size, the central processing unit 4 carries out the error notification (step S11). Hereafter, the central processing unit 4 closes the file and carries out the actions indicated at the below-mentioned steps S8 and S9, and the process ends.

On the other hand, in the case that the free area is larger than the designated block size, the central processing unit 4 issues the data write command to the disk apparatus 1 (FIG. 1) to write the data on the disk medium 11 (FIG. 1) in units of blocks (step S5). Thereby, in each block 30 (FIG. 2) on the disk medium 11, the assigned ID number is recorded in the ID portion 32 of the sub-code portion 30a (FIG. 2). Further, the corresponding head LBA 34 of the preceding block and the corresponding head LBA 35 of the next block are recorded in the link portion 33 of the sub-code portion 30a. Furthermore, data itself to be recorded is recorded in the data portion 30b for every block 30 on the disk medium 11. Moreover, the copy 30c (FIG. 2) of the sub-code portion is recorded for every block 30 on the disk medium 11. The sub-code portion 30a, the data portion 30b and the copy 30c of the sub-code portion are recorded continuously when the recording and reproducing apparatus 12 (FIG. 1) makes access the disk medium 11 once.

Next, the central processing unit 4 updates the free area information on the program storage apparatus 2, and also updates the storage position information on the program storage apparatus 2 (step S6). Hereafter, the central processing unit 4 enters a command wait state, and waits until the operator inputs the file write command or the file close command (step S7).

When the file write command is input, the procedure conducted by the central processing unit 4 returns to step S4, and actions up to step S6 are repeated.

When the file close command is input, the central processing unit 4 records the storage position information and the free area information on the program storage apparatus 2 in the storage position management portion 24 and the free area management portion 25 on the disk medium 11, respectively, to update the information (step S8).

Then, the central processing unit 4 writes information in the file information 31 stored in the directory management portion 21 (FIG. 2) of the disk medium 11 (step S9). More specifically, the flag indicating "false" is recorded in the write-open flag 30g of the file information 31. Other information in the file information 31, i.e. the attribute information 31b including file size, is recorded in the file information 31.

Next, a process of adding data to the file in the data processing apparatus of the present embodiment will be described below. This process is similar to the file creation process except for steps S1 and S3. Therefore, FIG. 4 is also used for explanation.

First, at step S1, the operator specifies the open mode wherein a file name and additional writing are designated. The central processing unit 4 carries out the file open step.

Next, the central processing unit 4 retrieves the file information 31 holding the designated file name in the directory management portion 21 of the disk medium 11. The central processing unit 4 then obtains the block size 31c, the FAT number 31e and the file size in the attribute information 31b based upon the retrieved file information 31. In addition, FAT numbers following the head FAT number 31e of the obtained file are retrieved in sequence in the storage position information on the program storage apparatus 2, and thereby to obtain the last FAT number finally. Furthermore, the storage number is calculated with the file size and the block size 31c obtained at step S1 and the number of blocks capable of being accommodated in one FAT. Specifically, when Fs, Bs and Bm designate the respective values of the file size, block size 31c and the number of blocks capable of being accommodated in one FAT, a remainder r1 of a division (Fs/(Bs×Bm)) is calculated. Furthermore, the storage number is obtained with a value Q1 of a quotient divided the remainder r1 by the block size Bs. In the case that a remainder occurs in the calculation, the storage number is obtained by adding "1" to the value Q1 of the quotient. The head LBA of the last block is thus obtained, whereby the last block is read, and the ID number assigned to the ID portion of the last block is obtained.

Next, as shown at step S2, the central processing unit 4 makes a comparison between the free area and the block size 31c. In the case that the data can be added to the free area, the write-open flag 31g of the file information 31 is only rewritten at step S3. In other words, a flag indicating "true" is recorded in the write-open flag 31g. The actions following step S4 are the same as those of the file creation process.

Next, a process of reading data from the file in the data processing apparatus of the present embodiment will be described below.

First, sequential data reading from the head of the file will be described below.

In this case, the file open step is carried out when the file open mode for designating a file name and data reading is input to the central processing unit 4.

Next, in the directory management portion 21, the central processing unit 4 retrieves the file information 31 wherein the designated file name is written. The central processing unit 4 obtains the block size 31c and the head LBA 31d upon the retrieved file information 31. Hereafter, the central processing unit 4 reads the head block from the data storage area portion 29 on the basis of the obtained head LBA 31d, and reads the link portion 33 of the sub-code portion 30a in the block having been read. Then, while obtaining the head LBA 35 of the next block from the link portion 33 having been read, the central processing unit 4 reads the block of the next link destination in sequence. In the case of this sequential data reading, the last access date and time and the like in the file attribute information 31b are updated at the file close step.

Next, a process of randomly reading data of any given blocks in the file will be described below.

First, the operator specifies the position of data desired to be read from the file by designating the number of bytes or the number of blocks from the head of the file, and gives an instruction to the central processing unit 4 to carry out the file open step.

After the file open step is carried out just as in the case of the above-mentioned sequential data reading process, the central processing unit 4 obtains the block size 31c and FAT number 31e from the file information 31 retrieved from the directory management portion 21. Then, the central processing unit 4 obtains the FAT number and the storage number holding "the head LBA of the block including the target data" on the basis of the designated number of bytes or blocks and the obtained FAT number 31e. In the case when the number D1 of bytes is used for the designation, a value Q2 of a quotient is calculated with a division (D1/(Bs×Bm)), wherein Bs and Bm designate values of the obatained block size 31c and the number of blocks capable of being accomodated in one FAT, respectively. Furthermore, the FAT number is calculated by adding a value of the obtained FAT number 31e to the value Q2 of the quotient. In the storage number, a remainder r2 is calculated by the division (D1/(Bs×Bm)). Furthermore, the storage number is obtained with a value Q3 of a quotient divided the remainder r2 by the block size Bs. In the case that a remainder occurs in the calculation, the storage number is obtained by adding "1" to the value Q3 of the quotient. Furthermore, in the case when the number D2 of blocks is used for the designation, a value Q4 of a quotient is calculated with a division (D2/Bm). Furthermore, the FAT number is calculated by adding a value of the obtained FAT number 31e to the value Q4 of the quotient. In the storage number, a remainder r3 is calculated by the division (D2/Bm). Furthermore, the storage number is obtained with a value Q5 of a quotient divided the remainder r3 by the block size Bs. In the case that a remainder occurs in the calculation, the storage number is obtained by adding "1" to the value Q5 of the quotient. As a result, the head LBA of the target block can be obtained. Next, the central processing unit 4 reads the target block from the data storage area portion 29 on the basis of the head LBA. Then, the central processing unit 4 reads the link portion 32 from the sub-code portion 30a in the block, and the block of the next link destination in sequence while obtaining the head LBA of the next block.

Next, a file deleting process in the data processing apparatus of the present embodiment will be described below referring to FIG. 5.

FIG. 5 is a flowchart showing an operation of a file deleting process in the data processing apparatus shown in FIG. 1.

As shown in FIG. 5, when the operator inputs a file deletion command together with the name of a file to be deleted, the central processing unit 4 retrieves the file information 31 holding the designated file name in the directory management portion 21 of the disk medium 11 (step S12).

Next, the central processing unit 4 obtains the head LBA 31d, the head FAT number 31e and the head storage number 31f from the retrieved file information 31 (step S13). Furthermore, the central processing unit 4 obtains the file size from the attribute information 31b. As a result, it is possible to obtain the end LBA of the file and the number of blocks constituting the file.

Next, the central processing unit 4 updates the free area information and the storage position information on the program storage apparatus 2 (step S14). More specifically, while retrieving the storage position information in the program storage apparatus 2, the central processing unit 4 registers the blocks of the file to be deleted, as new free areas in the free area information on the program storage apparatus 2, so that the free area information is updated. This registration of the new free areas is sequentially carried out every block size beginning with the head LBA of each block. Furthermore, the head position of the storage position information to be deleted can be obtained on the basis of the FAT number 31e and the head storage number 31f obtained at the above-mentioned step S13. Therefore, the central processing unit 4 deletes the storage position information on the program storage apparatus 2, namely, deletes the locations holding the head LBAs of all the blocks of the file to be deleted. More specifically, in each FAT, 0 is written in the head LBAs of all the blocks, for example. Furthermore, when a file to be designated with a plurality of FATs is deleted, this deletion is carried out as described below. The central processing unit 4 obtains the next FAT number on the basis of the FAT number obtained at step S13, and deletes the head LBAs of the blocks to be deleted in the FAT designated by the next FAT number in the same way. Furthermore, 0 is written in the preceding FAT number and the next FAT number in the FAT to be deleted.

Next, the central processing unit 4 records the storage position information and the free area information, which is updated on the program storage apparatus 2, in the storage position management portion 24 and the free area management portion 25 on the disk medium 11, so as to carry out updating (step S15).

In the end, the central processing unit 4 deletes the registration of the file information 31 holding the file name 31a of the deleted file from the directory management portion 21 (step S16). More specifically, a blank or a value such as 0 is recorded in the column of the file name 31 of the file information 31.

Next, a file management information recovery process in the data processing apparatus of the present embodiment will be described below referring to FIG. 6. After data writing in the file was ended due to power shut-off without the file close step, for example, the file management information recovery process is carried out automatically, immediately after an electric power is turned on again.

Figure 6:
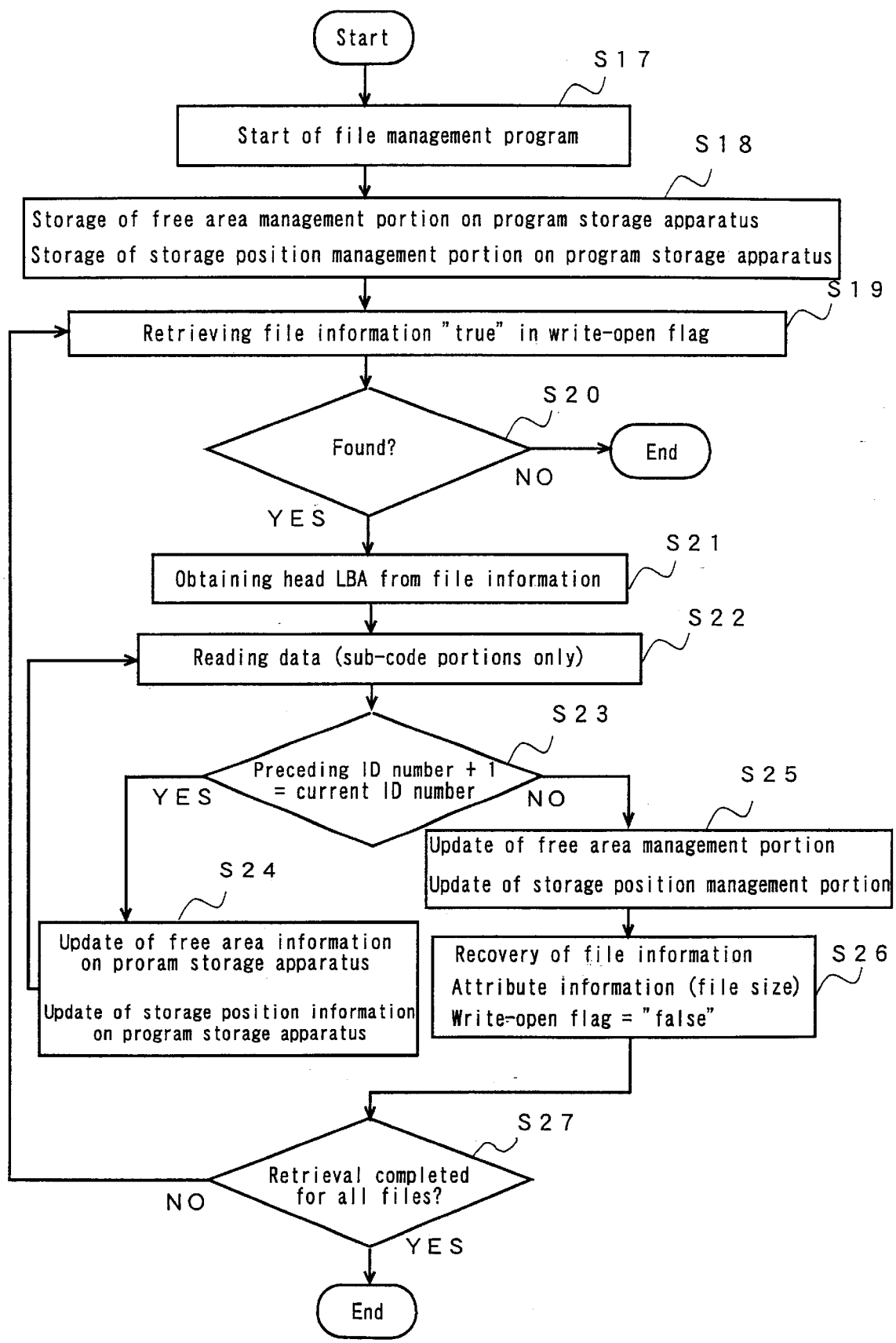
FIG. 6 is a flowchart showing an operation of a file management information recovery process in the data processing apparatus shown in FIG. 1.

FIG. 6 is a flowchart showing an operation of a file management information recovery process in the data processing apparatus shown in FIG. 1.

In FIG. 6, when the electric power is turned on again, the file management program is started (step S17). Immediately after the start, all the information of the storage position management portion 24 and the free area management portion 25 on the disk medium 11 is read and stored in the program storage apparatus 2 (step S18).

Next, the central processing unit 4 retrieves the file information 31 holding the flag indicating "true" in the write-open flag 31f from all the file information 31 in the directory management portion 21 (step S19). The central processing unit 4 then detects the file information 31 holding the flag indicating "true" (step S20). In the case that nothing is detected, the central processing unit 4 judges that the file close step has been carried out properly, thereby completing the file management information recovery process.

In the case that the file information 31 holding the flag indicating "true" is detected, the central processing unit 4 obtains the head LBA 31d from the detected file information 31 (step S21). Next, the central processing unit 4 sequentially reads the sub-code portions 30a of the blocks, beginning with the head block of the data, on the basis of the obtained head LBA 31d (step S22).

Next, the central processing unit 4 judges whether the blocks of the data designated by the detected file information 31 are continuous to one another or not. More specifically, the central processing unit 4 judges whether the ID number of the ID portion 32 included in the sub-code portion 30a having been read this time (hereinafter referred to as "the current ID number") is equal to the ID number having been read the last time (hereinafter referred to as "the preceding ID number") plus 1 (step S23). At this time, the central processing unit 4 first judges whether the current ID number is the head ID number or not. For example, when the current ID number is 1, this ID number is compared with 0 used as the preceding ID number, or the procedure of this process goes to step S24 described later. Furthermore, when the current ID number is an ID number other than the head ID number, the central processing unit 4 judges whether the current ID number is "the preceding ID number+1" or not.

When the current ID number is "the preceding ID number+1," the central processing unit 4 judges that the two blocks are continuous to each other, and the procedure advances to step S24.

Next, the central processing unit 4 updates the storage position information and the free area information on the program storage apparatus 2 on the basis of the information of the link portion 33 included in the sub-code portion 30a having been read (step S24), and the procedure returns to step S22 to detect the next block.

On the other hand, when the current ID number is not "the preceding ID number+1" at step S23, the central processing unit 4 judges that the two blocks are not continuous to each other. Then, the central processing unit 4 judges that the block represented by the preceding ID number is the last block of the file, and the procedure advances to step S25 described below.

Next, the central processing unit 4 reads the storage position information and the free area information on the program storage apparatus 2. The central processing unit 4 records the storage position information and the free area information in the storage position management portion 24 and the free area management portion 25 on the disk medium 11, respectively, and thereby to carry out updating (step S25). This recovers the storage position information and the free area information in the file management information.

Next, the central processing unit 4 recovers the file information 31, i.e. the remaining management information (step S26). More specifically, the file size included in the attribute information 31b of the file is set to a correct value on the basis of the head block and the last block having been judged at the above-mentioned step S23. Furthermore, a flag indicating "true" is recorded in the write-open flag 31g.

Next, the central processing unit 4 judges whether retrieval has been completed for all the files or not (step S27). In the case that retrieval has not been completed for all the files, the procedure returns to step S19. On the other hand, in the case that retrieval has been completed for all the files, the central processing unit 4 completes the file management information recovery process.

In the data processing apparatus and file management method therefor of the present embodiment, by the above-mentioned file management information recovery process, a series of blocks having continuous ID numbers is judged to be data for one file, thereby making it possible to recover the management information of the file. Therefore, in the data processing apparatus and file management method therefor of the present embodiment, data can be read by using the recovered file management information. Thereby, it becomes possible to solve the problem of "the electric power is shut off during file writing, no data can be read from the file after restart" encountered in the conventional example.

In the data processing apparatus and file management method therefor of the present embodiment, the file information 31 created for each file is provided with the write-open flag 31f. Furthermore, in the condition wherein the file is open while data is ready to be written in the file, the flag indicating "true" is recorded in the write open flag 31f. In other conditions, the flag indicating "false" is recorded in the write-open flag 31f. Therefore, in the data processing apparatus and file management method therefor of the present embodiment, a file undergone ending in the middle of file writing can be promptly detected by carrying out the file management information recovery process after restart, for example. As a result, it is not required to carry out the file management information recovery process for all the files on the disk medium 11. Therefore, it is possible to significantly reduce the time required for the file management information recovery process after restart.

Furthermore, in the data processing apparatus and file management method therefor of the present embodiment, the copy 30c of the sub-code portion is created in units of blocks and stored together with the data portions 30b and the sub-code portions 30a of the corresponding blocks in the data storage area portion 29. Therefore, in the data processing apparatus and file management method therefor of the present embodiment, even when a specific sub-code portion 30a cannot be read because of a defective area generated on the disk medium 11, the required data portion 30b can be read by referring to the copy 30c of the sub-code portion in the file data reading process or the file management information recovery process. As a result, in the data processing apparatus and file management method therefor of the present embodiment, data processing can be continued automatically.

Figure 11:
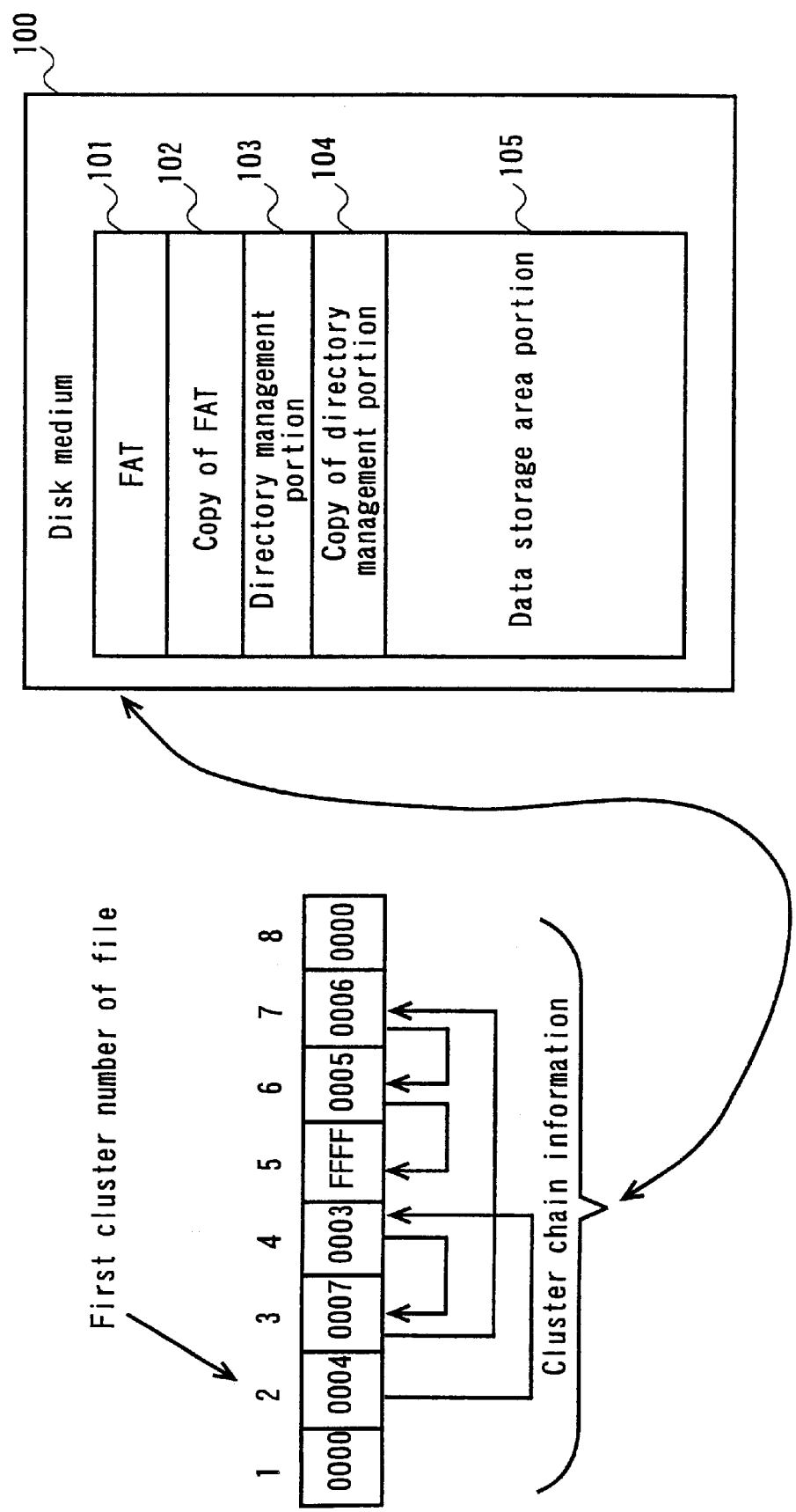
FIG. 11 is an explanatory view showing a specific example of a FAT used for the conventional file management method.

The advantages of the file management method of the present embodiment over that of the conventional example explained referring to FIG. 11 will be described below more specifically.

At the time of recording computer programs and bitmap data, when a 16-bit FAT is used for example, the whole storage area of the disk medium is divided into 65534 clusters and managed in the case of the conventional file management method. Therefore, the size of one cluster is 32 KB for a disk apparatus of 2 GB capacity. When 65534 files each having a data size of 10 KB (for example) to be stored are stored, one cluster, i.e. 32 KB, is allocated to one file. Therefore, in the conventional file management method, no free area is available in view of the management of the files, whereby an area having a capacity of 1441 MB (=22 KB (=32 KB–10 KB)×65534) becomes an invalid area.

On the other hand, in the case of the file management method of the present embodiment, when it is assumed that the block size is 10240 bytes (20 sectors), it is possible to secure a free area amounting to 1328 MB (=2 GB–10240 B×65534), whereby an area amounting to 16 MB (240(= 10240 B–10 KB)×65534) becomes the invalid area. In the file management method of the present embodiment, since the block size is designated for each file, it is possible to extremely reduce the invalid area of 16 MB compared with that of 1441 MB in the conventional method.

Furthermore, when the AV data having been recorded undergoes high-speed reproduction such as fast forward and rewinding, in the conventional file management method, it is possible to attain fast forward reproduction by detecting the cluster chain information in the FATs in the normal direction. However, in the conventional file management method, the cluster chain information in the FATs cannot be detected in the reverse direction. Therefore, in the conventional file management method, the cluster chain information in the FATs is required to be detected in the normal direction even if the rewinding reproduction is carried out, thereby requiring much processing time in the central processing unit. As a result, in the conventional file management method, it requires much time to detect the storage position of the target AV data, thereby making it difficult to carry out smooth rewinding reproduction.

On the other hand, in the data processing apparatus and file management method therefor of the present embodiment, when each block 30 is recorded, the head LBA 34 of the preceding block and the head LBA 35 of the next block are stored in the link portion 33. For this reason, in the data processing apparatus and file management method therefor of the present embodiment, data reading can be carried out easily not only in the normal direction but also in the reverse direction, so as to be almost no burden on the processing at the central processing unit. Therefore, in the data processing apparatus and file management method therefor of the present embodiment, it impossible to carry out smooth rewinding reproduction easily.

The following describes a specific method of determining an appropriate block size depending on the transfer speed of the AV data to be recorded at the file open step in the data processing apparatus and file management method therefor of the present embodiment.

The above-mentioned block size is greatly dependent on the characteristic of the disk apparatus 1. However, in the case when the central processing unit 4 has already grasped the characteristic of the disk apparatus 1 connected thereto in advance, the central processing unit 4 can obtain the best suited block size on the basis of the characteristic of the disk apparatus 1 and the required transfer speed of the AV data. The characteristic of the disk apparatus 1 herein relates to the minimum transfer speed of the disk apparatus 1 with respect to its continuous writing size. The minimum transfer speed can be obtained by dividing the maximum response time of the disk apparatus 1 by the continuous writing size. Furthermore, although the maximum response time of the disk apparatus 1 can be measured actually, the time can also be obtained by calculation. In other words, it is assumed that T is a time adding a seek time at the time when the maximum stroke occurs in the disk apparatus 1 and the maximum rotation waiting time (the time for one rotation of the disk medium 11). Furthermore, it is also assumed that Vd is a recording or reading speed on the disk medium 11, and that L is the continuous writing size. The maximum response time can thus be calculated by using the following equation (1):

$$\text{Maximum response time} = T + L/Vd \qquad (1)$$

The relationship between the continuous writing size and the minimum transfer speed of the disk apparatus 1 will be described below specifically, referring to FIG. 7.

Figure 7:
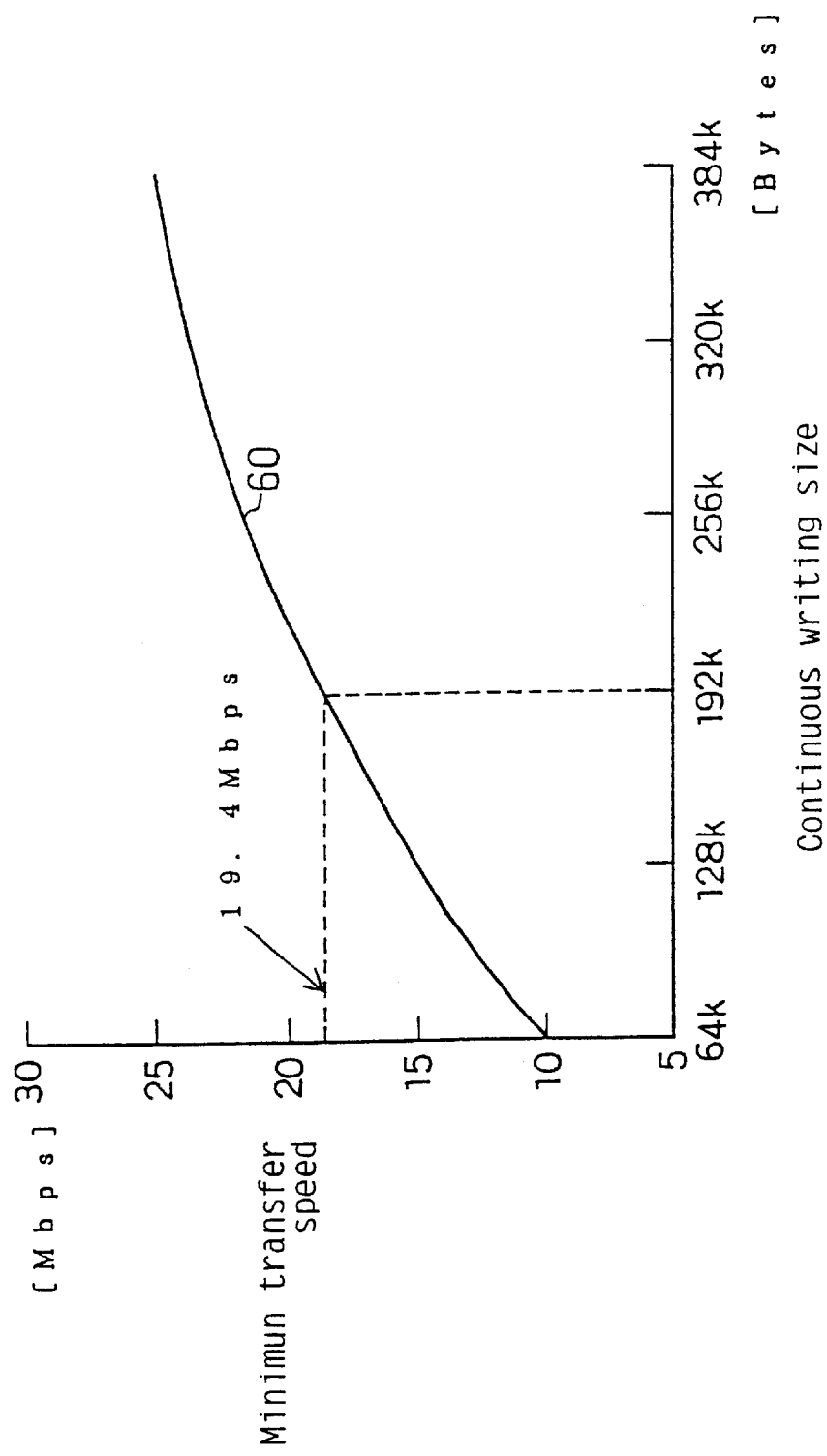
FIG. 7 is a graph showing an example of the relationship between a continuous writing size and a minimum transfer speed in the disk apparatus.

FIG. 7 is a graph showing an example of the relationship between the continuous writing size and the transfer speed of the disk apparatus.

As shown by the curve 60 of FIG. 7, there is a unique relationship between the continuous writing size and the minimum transfer speed of the disk apparatus 1. For this reason, the central processing unit 4 obtains the minimum transfer speed, which is not less than the transfer speed of the AV data to be recorded, of the disk apparatus 1. The central processing unit 4 determines the block size by the continuous writing size uniquely determined by the obtained minimum transfer speed. For this reason, the block size of the AV data to be recorded on the disk medium 11 becomes appropriate, thereby making it possible to ensure the above-mentioned transfer speed of the AV data. The continuous writing size (block size) designated by the curve 60 is obtained by calculation as a value capable of being divided by the number of sectors, and is rounded up so as to be an integral multiple of 512. For example, when a transfer rate of 19.4 Mbps is requested as the transfer speed of the AV data, the block size of the AV data becomes 192 KB as indicated by the curve 60. In the data processing apparatus and file management method therefor of the present invention, the characteristic, for example, indicated by the curve 60 of FIG. 7 is tabulated and held in advance. Therefore, in the data processing apparatus and file management method therefor of the present embodiment, once the operator designates the transfer speed of the AV data to be recorded at the file open step, the block size most suited for transfer speed of the AV data can be determined automatically. Furthermore, the block size can also be determined by using the following equation (2), instead of tabulating the above-mentioned characteristic.

$$L/Vs = T + L/Vd \qquad (2)$$

in the equation (2), Vs designates a transfer speed requested for the AV data. In addition, the block size can be obtained by rounding up the continuous writing size L calculated by the equation (2) so as to be an integral multiple of 512.

In this way, in the data processing apparatus and file management method therefor of the present embodiment, the block size most suited for the transfer speed of the AV data to be recorded can be determined and recorded automatically, thereby ensuring the transfer speed of the AV data.

As described in the above, in the data processing apparatus and file management method therefor of the present embodiment, the continuous ID numbers are assigned to the continuous blocks, respectively, and each of the assigned ID numbers is stored in the ID portion of the sub-code portion. In addition, address information indicating the recording position of the head of at least the next block is stored in the link portion of the sub-code portion, and recorded together with the data portion of the block on the disk medium of the disk apparatus. Therefore, in the data processing apparatus and file management method therefor of the present embodiment, the continuity of the blocks can be judged easily by reading the link portions of the blocks in sequence and by comparing the ID numbers of the respective ID portions. As a result, even if the free area information and the storage position information under updating in the program storage apparatus are not updated because of power shut-off or reset during data writing, the file management information can be recovered and the file data can be read by judging the continuous blocks as one file after restart.

The ID number to be stored in the ID portion should only be a number capable of being used to confirm whether the blocks are continuous or not. For example, the same ID number may be assigned to all the blocks included in one file so that a unique ID number is assigned to each file. In the case that this kind of ID number is used, for example, 0 is recorded in the ID portion of each block of the file when the file is deleted. Further, a natural number other than "0" indicating file deletion is used as the unique ID number for each file. Furthermore, when the file management information recovery process is carried out, the block continuity judgment process indicated at step S23 of FIG. 6 can be carried out by judging whether the ID numbers of two blocks are the same or not.

In addition, in the data processing apparatus and file management method therefor of the present embodiment, in the case of recording the AV data, one frame of video signal data may be recorded as one block. Furthermore, the frame count for counting one frame as one count, or the time information for taking one frame as 1/P second (P: an integer) may be used as the ID number to be stored in the ID portion.

Moreover, in the data processing apparatus and file management method therefor of the present embodiment, the management information to be stored in the allocation information management portion is not limited to the above-mentioned LBA. The management information should only be information capable of managing data (blocks) whose block size is changeable for each file. For example, a system of recording the start LBA and the end LBA of the file may be used for the storage position management portion, in the same way as used for the free area management portion. Additionally, when the block size is set to a fixed length for all the files, the management information similar to that of the conventional example wherein one FAT is used for the whole disk medium may be stored in the allocation information management portion.

Furthermore, a configuration wherein all the information in the storage position management portion is read and stored in the program storage apparatus at the time of start is described in the above explanation. However, it is possible to have a configuration wherein only one or some of plural FATs 1 to n are read and stored in the program storage apparatus at the file open step. This configuration can reduce the amount of memory consumed in the program storage apparatus.

Second Embodiment

[Configuration of the Data Processing Apparatus]

FIG. 8 is a block diagram showing a schematic configuration of a data processing apparatus in accordance with a second embodiment of the present invention. In the data processing apparatus of the present embodiment, a program storage apparatus for storing a file management program at the time of start and a program execution apparatus for carrying out the file management program are provided in a disk apparatus. Furthermore, a file management interface is provided for connection between the disk apparatus and the central processing unit to drive the above-mentioned disk apparatus under the management of an operating system. Other components are the same as those of the first embodiment, and not explained to eliminate overlap of explanation.

As shown in FIG. 8, in the data processing apparatus of the present embodiment, a disk apparatus 41 comprises a program storage apparatus 42 for storing a file management program 52 (FIG. 9) for carrying out file management at the time of operation and a program execution apparatus 43 for executing the file management program, in addition to the disk medium 11 and the recording and reproducing apparatus 12.

The program storage apparatus 42 is a high-speed memory apparatus for executing the file management program 52 having been recorded. The program execution apparatus 43 is formed of a CPU or MPU having functions nearly similar to those of the central processing unit 4, and having slower processing speed and smaller circuit size than those of the central processing unit 4.

Furthermore, in the data processing apparatus of the present embodiment, in order to drive the above-mentioned disk apparatus 41 under the management of an operating system 50 (FIG. 9), a command issued from the central processing unit 4, for example, is required to be converted into a format suited for the disk apparatus 41 and then output. For this purpose, in the data processing apparatus of the present embodiment, a file management interface 51 (FIG. 9) is stored in the program storage apparatus 2. This file management interface 51 is formed of software (programs), for example (the detail will be described later). In addition, unlike the interface of the first embodiment, the interface 3 of the present embodiment can ensure the transfer speed of the AV data, and conforms to the IEEE Standard, 1394-1995 (IEEE Standard for a High Performance Serial Bus), for example.

In the following explanation of the file management method of the data processing apparatus of the present embodiment, the same file management method as that described in the first embodiment is used to simplify the explanation. In other words, in the following explanation, the data processing apparatus processes the AV data input and output by an input apparatus 5 and an output apparatus 6 for example, while carrying out file management using the same file management program 52 as that of the first embodiment. Furthermore, in the following explanation, the configuration excluding the disk apparatus 41, that is, the whole configuration of the hardware comprising the program storage apparatus 2, the interface 3, the central processing unit 4, the input apparatus 5, the output apparatus 6, the bus 7 and the special-purpose bus 8 is simply referred to as a host apparatus.

The software configuration of the data processing apparatus of the present embodiment will be described below referring to FIG. 9.

Figure 9:
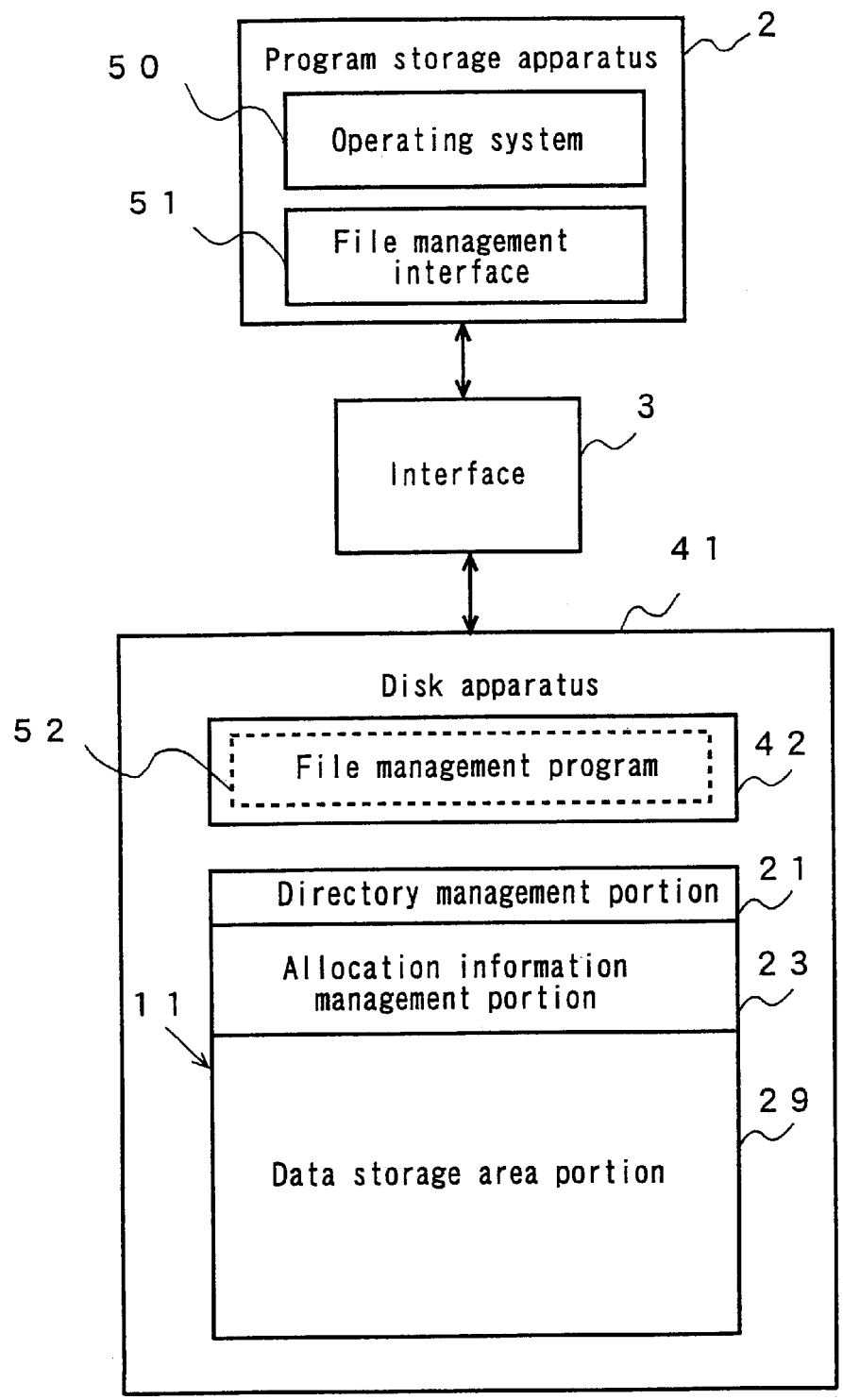
FIG. 9 is an explanatory view showing a software configuration of the data processing apparatus shown in FIG. 8.

FIG. 9 is an explanatory view showing a software configuration of the data processing apparatus shown in FIG. 8.

As shown in FIG. 9, the program storage apparatus 2 on the side of the host apparatus holds the operating system 50 and the file management interface 51. On the other hand, the program storage apparatus 42 of the disk apparatus 41 holds the file management program 52. This file management program 52 is stored in a predetermined storage area (not shown) on the disk medium 11, and read and stored from the disk medium 11 to the program storage apparatus 42 when the data processing apparatus is started. Furthermore, just as in the case of the first embodiment, the file management information is stored in the directory management portion 21 (FIG. 2) and the allocation information management portion 23 (FIG. 2) on the disk medium 11 of the disk apparatus 41. Further, the data blocks constituting the file are stored in the data storage area portion 29 (FIG. 2).

The data processing apparatus of the present embodiment is provided with the above-mentioned file management interface 51, whereby the file management program 52 in the disk apparatus 41 can be executed under the management of the operating system 50 on the basis of commands from the central processing unit 4. In addition, the file management interface 51 is created separately from the operate system 50 and stored in the program storage apparatus 2. For this reason, the file management program 52 can be changed without changing or upgrading the operating system 50 in the data processing apparatus of the present embodiment. Therefore, in the data processing apparatus of the present embodiment, the file management method carried out in the disk apparatus 41 can be changed easily.

In the data processing apparatus of the present embodiment, the file management interface 51 formed of software is taken as an example as described above. However, the file management interface may be formed of hardware, such as an interface chip or an interface module, connected between the central processing unit 4 and the disk apparatus 41 to convert commands from the central processing unit 4 into the format suited for the disk apparatus 41 and to output the converted commands.

Figure 10:
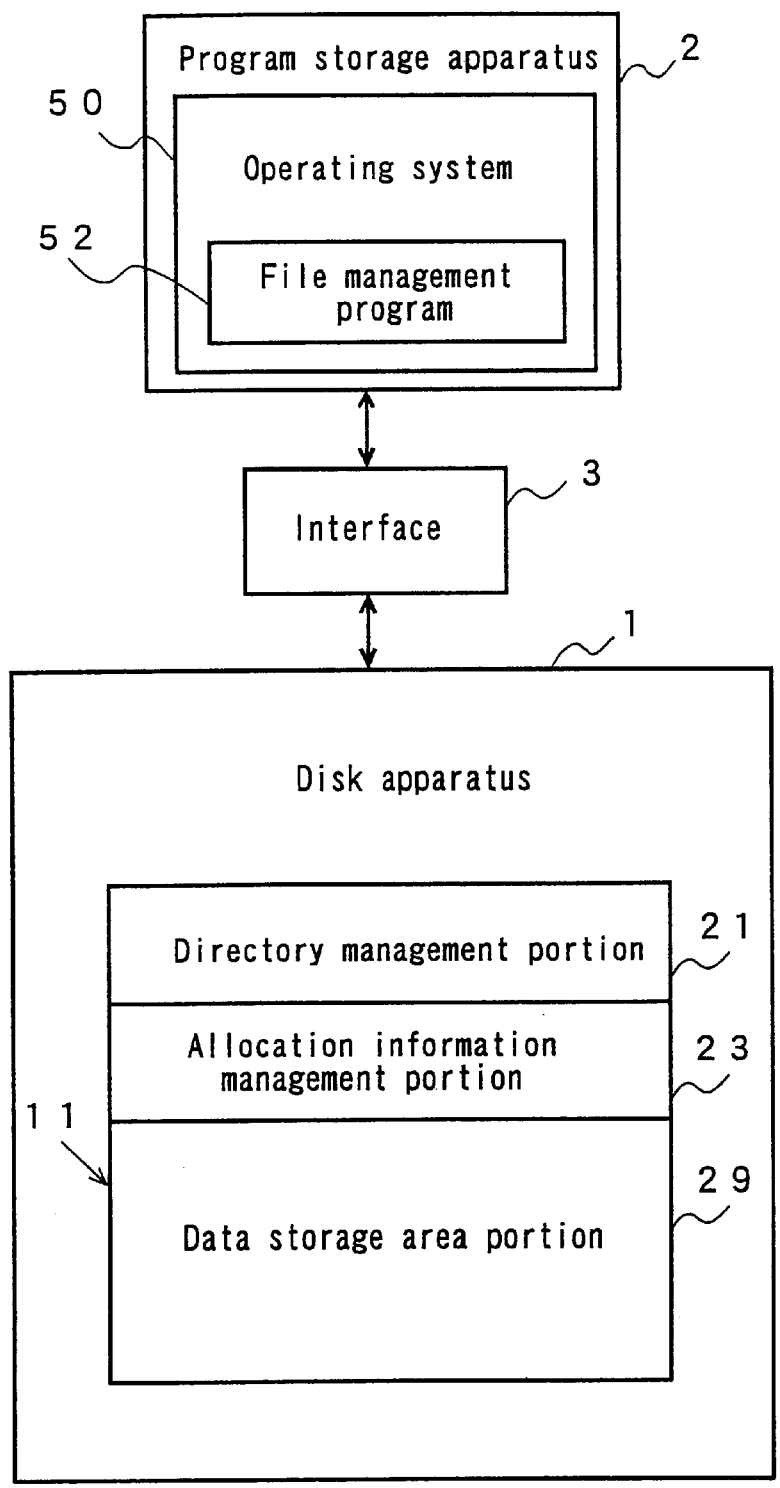
FIG. 10 is an explanatory view showing a software configuration of the data processing apparatus shown in FIG. 1.

The difference between the present embodiment and the first embodiment will be described below referring to FIG. 10 showing a software configuration of the data processing apparatus of the first embodiment shown in FIG. 1.

As shown in FIG. 10, in the data processing apparatus of the first embodiment, the file management program 52 is included in the operating system 50, and stored in the program storage apparatus 2 on the side of the host apparatus. Furthermore, in the data processing apparatus of the first embodiment, the file management information stored in the allocation information management portion 23 is read by the program storage apparatus 2 at the time of operation. Therefore, in the data processing apparatus of the first embodiment, file management is carried out by the program storage apparatus 2 and the central processing unit 4 on the side of the host apparatus.

In comparison with this, as shown in FIG. 9, in the data processing apparatus of the present embodiment, the file management program 52 is stored in the program storage apparatus 42 of the disk apparatus 41 at the time of operation. Furthermore, the storage position information and free area information stored in the allocation information portion 23 are also read in the program storage apparatus 42 of the disk apparatus 41 at the time of operation. For this reason, in the data processing apparatus of the present embodiment, the host apparatus does not care about the file management information including the allocation information of data recorded on the disk medium 11 at all, and file management is carried out in the disk apparatus 41.

[Operation of the Data Processing Apparatus]

Operation of the data processing apparatus of the present embodiment will be described below.

When the data processing apparatus is turned on or restarted, the operating system 50 and the file management interface 51 in the program storage apparatus 2 are started on the side of the host apparatus, and executed by the central processing unit 4.

On the other hand, in the disk apparatus 41, the file management program 52 is read and stored from the disk medium 11 to the program storage unit 42 at the time of power on or restart. The program execution apparatus 43 executes the file management on the basis of the management program 52 stored in the program storage apparatus 42. This manages the data of the file to be recorded and reproduced in the data storage area portion 29 of the disk medium 11.

Next, the file management operation of the data processing apparatus of the present embodiment will be described below.

In the data processing apparatus of the present embodiment, the central processing unit 4 on the side of the host apparatus gives instructions for the disk apparatus 41 in order to carry out data processing such as file creation and addition, writing data to files, reading data from files, deleting files. The operating system 50 issues commands, such as file open, file close, file write, file read, file delete and file seek, to the file management interface 51. In addition to the above-mentioned commands, the operating system 50 also issues commands, such as a directory command for obtaining file list information and a file status command for obtaining attribute information of each file, to the file management interface 51. Furthermore, the operating system 50 issues a program download command to the file management interface 51 in order to update the file management program 52 from the host apparatus.

The file management interface 51 receives such an above-mentioned command and converts the received command into a format suited for the disk apparatus 41. This command is sent to the file management program 52 being executed by the program execution apparatus 43 of the disk apparatus 41 via the interface 3. The file management program 52 receives the command and executes the received command on the basis of the file management program 52. Specific actions carried out by commands, such as file read and file write, to be executed on the basis of the file management program 52 are the same as those described in the first embodiment, and their explanations are omitted.

Next, the program download command will be described below.

When the file management interface 51 issues the program download command, and the host apparatus transfers a new file management program 52 to the disk apparatus 41, the program execution apparatus 43 receives the program download command and stores the new file management program 52 in a predetermined recording area of the disk medium 11. As a result, at the time of the next start, the new file management program 52 is stored from the disk medium 11 to the program storage apparatus 42, and executed by the program execution apparatus 43.

As described in the above, in the data processing apparatus of the present embodiment, the new file management program 52 can be updated from the host apparatus through the interface 3 by executing the program download command. Thereby, in the data processing apparatus of the present embodiment, the file management method can be changed easily.

Furthermore, in the data processing apparatus of the present embodiment, when the file management program 52 receives the file open command for carrying out data reading, the file management program 52 reads the link portions 33 (FIG. 2) of the data of the designated file name in sequence, beginning with the head block 30 (FIG. 2). Thereby, in the data processing apparatus of the present embodiment, the file management program 52 can store the blocks 30 indicated by the link portions 33 as many as possible in the program storage apparatus 42. As a result, even when the file read command is sent at the next time to the file management program 52, the block 30 designated by the command can be output immediately from the program storage apparatus 42. In this way, the data processing apparatus of the present embodiment uses the file management program 52 executed in the disk apparatus 41. For this reason, in the data processing apparatus of the present embodiment, data prefetch can be made far more effectively compared with that of the first embodiment. Therefore, the data processing apparatus of the present embodiment is suited for processing the AV data, more particularly continuous media data. In other words, prefetch cannot be attained when the recording areas in the clusters designated in the cluster chain information are not continuous in the case of the first embodiment. However, in the case of the present embodiment, prefetch processing can be attained even when the recording areas in the clusters are not continuous.

Furthermore, just as in the case of the first embodiment, the data processing apparatus of the present embodiment can determine the block size best suited for the transfer speed requested for the AV data to be recorded, at the file open step, and can record the AV data in units of blocks on the disk medium. Since the above-mentioned method of determining the best suited block size is the same as that described in the explanation of the first embodiment referring to FIG. 7, the method is not explained herein. As described in the above, the data processing apparatus of the first embodiment carries out the file management on the side of its host apparatus. Therefore, in the data processing apparatus of the first embodiment, the central processing unit on the side of the host apparatus is required to grasp the characteristic of the disk apparatus to be used, beforehand, in order to determine the best suited block size. In contrast, in the data processing apparatus of the second embodiment, since the disk apparatus executes the file management, the central processing unit on the side of the host apparatus is not required to grasp the characteristic of the disk apparatus to be connected. As a result, the disk apparatus can record the AV data having the best suited block size, whereby the transfer speed of the AV data can be ensured.

As described in the above, in the data processing apparatus of the present embodiment, the program storage apparatus for storing the file management program at the time of operation and the program execution apparatus for executing the file management program are provided in the disk apparatus to execute file management in the disk apparatus. Furthermore, the data processing apparatus of the present embodiment is provided with the file management interface for converting a command issued from the central processing unit and outputting the command to the disk apparatus to operate the disk apparatus under the management of the operating system. With this configuration, the data processing apparatus of the present embodiment can easily change the file management method without changing or upgrading the operating system.

In the descriptions of the first and second embodiments, a data processing apparatus having the configuration wherein the disk apparatus is connected to the host apparatus formed of the PC is taken as an example. However, the host apparatus is not limited to the PC, but may be formed of an AV apparatus, such as a set top box (STB). Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure.

Accordingly, it is intended that the appended claims be interpreted as covering all alterations and modifications as fall within the true spirit and scope of the invention.

What is claimed is:

1. A data processing apparatus comprising:
   a disk apparatus for dividing data of a file into plural blocks and recording said plural blocks on a disk medium,
   a program storage apparatus for storing programs,
   a central processing unit for executing said programs, and
   an interface for connecting said disk apparatus, said program storage apparatus and said central processing unit,
   wherein, when each piece of data in one of said plural blocks is recorded as a data portion on said disk medium, continuous ID numbers are assigned to said individual continuous blocks, each of said assigned ID numbers is stored in an ID portion of a sub-code portion, address information indicating a recording position of the head of at least the next block is stored in a link portion of said sub-code portion, and said sub-code portion is recorded together with said data portion of said block on said disk medium.

2. A data processing apparatus in accordance with claim 1, further comprising an input portion for inputting audiovisual information and an output portion for outputting said audiovisual information.

3. A data processing apparatus in accordance with claim 2, wherein said program execution apparatus prefetches plural blocks on the basis of said link portion each of said plural blocks and stores said blocks in said program storage apparatus.

4. A data processing apparatus in accordance with claim 1, wherein said disk apparatus comprises a second program storage apparatus for storing a file management program for managing said file and a program execution apparatus for executing said file management program, and a file management interface for connecting said disk apparatus to said central processing unit is provided to carry out said file management in said disk apparatus.

5. A data processing apparatus in accordance with claim 4, wherein said program execution apparatus obtains minimum transfer speed, which is not less than the transfer speed of data to be recorded, of said disk apparatus, and determines said block size to be recorded on said disk medium on the basis of a continuous writing size uniquely determined for said obtained minimum transfer speed.

6. A data processing apparatus in accordance with claim 4, wherein said central processing unit outputs a program download command to said program execution apparatus to record a new file management program in said disk apparatus.

7. A data processing apparatus in accordance with claim 4, wherein a write-open flag indicating whether a file recorded on said disk medium is opened in a data writing ready condition or not is recorded in file information to be created for each file as file management information of the file.

8. A data processing apparatus in accordance with claim 4, wherein a copy of said sub-code portion is created in units of blocks and recorded together with said data portion and said sub-code portion of the corresponding block in said disk apparatus.

9. A data processing apparatus in accordance with claim 4, wherein a block size to be recorded on said disk medium is determined for each file.

10. A data processing apparatus in accordance with claim 4, wherein said link portion holds address information indicating recording positions of the heads of the blocks ahead of and next to the block corresponding to said link portion.

11. A data processing apparatus in accordance with claim 4, wherein said program execution apparatus prefetches plural blocks on the basis of said link portion each of said plural blocks and stores said blocks in said program storage apparatus.

12. A data processing apparatus in accordance with claim 1, wherein a write-open flag indicating whether a file recorded on said disk medium is opened in a data writing ready condition or not is recorded in file information to be created for each file as file management information of the file.

13. A data processing apparatus in accordance with claim 1, wherein a copy of said sub-code portion is created in units of blocks and recorded together with said data portion and said sub-code portion of the corresponding block in said disk apparatus.

14. A data processing apparatus in accordance with claim 1, wherein a block size to be recorded on said disk medium is determined for each file.

15. A data processing apparatus in accordance with claim 1, wherein said central processing unit obtains a minimum transfer speed, which is not less than the transfer speed of data to be recorded, of said disk apparatus, and determines said block size to be recorded on said disk medium on the basis of a continuous writing size uniquely determined for said obtained minimum transfer speed.

16. A data processing apparatus in accordance with claim 1, wherein said link portion holds address information indicating recording positions of the heads of the blocks ahead of and next to the block corresponding to said link portion.

17. A data processing apparatus comprising:
   a disk apparatus for dividing data of a file into plural blocks and recording said plural blocks on a disk medium, a program storage apparatus for storing programs, a central processing unit for executing said programs, and an interface for connecting said disk apparatus, said program storage apparatus and said central processing unit, wherein, when each piece of data in one of said plural blocks is recorded as a data portion on said disk medium, a unique ID number is assigned to said blocks of each file, said assigned ID number is stored in an ID portion of a sub-code portion, address information indicating a recording position of the head of at least the next block is stored in a link portion of said sub-code portion, and said sub-code portion is recorded together with said data portion of said block on said disk medium.

18. A file management method for storing plural blocks obtained by dividing data of a file and management information of said file on a disk apparatus, comprising:

a step of assigning continuous ID numbers to said individual continuous blocks, a step of storing each of said assigned ID numbers in an ID portion of a sub-code portions, a step of storing address information indicating a recording position of the head of at least the next block in a link portion of said sub-code portion, and a step of recording said sub-code portion together with said data portion of said block on said disk medium.

19. A file management method in accordance with claim 18, further comprising:

a step of comparing two of said ID numbers, and a step of checking whether two blocks assigned with said respective ID numbers are continuous or not on the basis of the result of the comparison at said comparison step, and judging that said two blocks belong to the same file in the case when said two blocks are continuous, and that said two blocks belong to different files in the case when said two blocks are not continuous.

20. A file management method in accordance with claim 18, wherein a write-open flag indicating whether a file recorded on said disk medium is opened in a data writing ready condition or not is recorded in file information to be created for each file.

21. A file management method in accordance with claim 18, wherein a copy of said sub-code portion is created in units of blocks and recorded together with said data portion and said sub-code portion of the corresponding block in said disk apparatus.

22. A file management method in accordance with claim 18, wherein a block size to be recorded on said disk medium is determined for each file.

23. A file management method in accordance with claim 18, wherein a minimum transfer speed, which is not less than the transfer speed of data to be recorded, of said disk apparatus is obtained, and said block size to be recorded on said disk medium is determined on the basis of a continuous writing size uniquely determined for said obtained minimum transfer speed.

24. A file management method in accordance with claim 18, wherein said link portion holds address information indicating recording positions of the heads of the blocks ahead of and next to the block corresponding to said link portion.

25. A file management method for storing plural blocks obtained by dividing data of a file and management information of said file on a disk apparatus, comprising:

a step of assigning a unique ID number to said blocks of each file, a step of storing each of said assigned ID numbers in an ID portion of a sub-code portions, a step of storing address information indicating a recording position of the head of at least the next block in a link portion of said sub-code portion, and a step of recording said sub-code portion together with said data portion of said block on said disk medium.

26. A file management method for storing plural blocks obtained by dividing data of a file and management information of said file on a disk apparatus, comprising:

a step of assigning continuous ID numbers to said individual continuous blocks, a step of storing each of said assigned ID numbers in an ID portion of a sub-code portions, a step of storing address information indicating a recording position of the head of at least the next block in a link portion of said sub-code portion, a step of recording said sub-code portion together with said data portion of said block on said disk medium, a step of comparing two of said ID numbers, and a step of checking whether two blocks assigned with said respective ID numbers are continuous or not on the basis of the result of the comparison at said comparison step, and judging that said two blocks belong to the same file in the case when said two blocks are continuous, and that said two blocks belong to different files in the case when said two blocks are not continuous.

27. A file management method in accordance with claim 26, wherein a write-open flag indicating whether a file recorded on said disk medium is opened in a data writing ready condition or not is recorded in file information to be created for each file.

28. A file management method in accordance with claim 26, wherein a copy of said sub-code portion is created in units of blocks and recorded together with said data portion and said sub-code portion of the corresponding block in said disk apparatus.

29. A file management method in accordance with claim 26, wherein a block size to be recorded on said disk medium is determined for each file.

30. A file management method in accordance with claim 26, wherein a minimum transfer speed, which is not less than the transfer speed of data to be recorded, of said disk apparatus is obtained, and said block size to be recorded on said disk medium is determined on the basis of a continuous writing size uniquely determined for said obtained minimum transfer speed.

31. A file management method in accordance with claim 26, wherein said link portion holds address information indicating recording positions of the heads of the blocks ahead of and next to the block corresponding to said link portion.

32. A file management method for storing plural blocks obtained by dividing data of a file and management information of said file on a disk apparatus, comprising:

a step of assigning a unique ID number to said blocks of each file, a step of storing each of said assigned ID numbers in an ID portion of a sub-code portions, a step of storing address information indicating a recording position of the head of at least the next block in a link portion of said sub-code portion, a step of recording said sub-code portion together with said data portion of said block on said disk medium, a step of comparing two of said ID numbers, and a step of checking whether two blocks assigned with said respective ID numbers are continuous or not on the basis of the result of the comparison at said comparison step, and judging that said two blocks belong to the same file in the case when said two blocks are continuous, and that said two blocks belong to different files in the case when said two blocks are not continuous.

* * * * *